(12) United States Patent
Ardhanari et al.

(10) Patent No.: US 11,295,234 B2
(45) Date of Patent: Apr. 5, 2022

(54) METHODS AND SYSTEMS FOR TRAINING A MACHINE LEARNING SYSTEM USING A REDUCED DATA SET

(71) Applicant: Rovi Guides, Inc., San Jose, CA (US)

(72) Inventors: Sankar Ardhanari, Windham, NH (US); Sai Rahul Reddy Pulikunta, North Andover, MA (US); Sashikumar Venkataraman, Andover, MA (US); Abubakkar Siddiq, Methuen, MA (US); Ganesh Ramamoorthy, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 1135 days.

(21) Appl. No.: 15/854,167

(22) Filed: Dec. 26, 2017

(65) Prior Publication Data

US 2019/0197012 A1    Jun. 27, 2019

(51) Int. Cl.
| | | |
|---|---|---|
| *G06N 20/00* | (2019.01) | |
| *G06K 9/62* | (2022.01) | |
| *G06F 40/205* | (2020.01) | |
| *H04N 21/482* | (2011.01) | |
| *H04N 21/84* | (2011.01) | |

(52) U.S. Cl.
CPC .......... *G06N 20/00* (2019.01); *G06F 40/205* (2020.01); *G06K 9/6253* (2013.01); *G06K 9/6256* (2013.01); *G06K 9/6267* (2013.01); *H04N 21/482* (2013.01); *H04N 21/84* (2013.01); *H04N 21/4826* (2013.01)

(58) Field of Classification Search
CPC .... G06N 20/00; G06F 40/205; G06K 9/6253; G06K 9/6256; G06K 9/6267; H04N 21/4826; H04N 21/84; H04N 21/8405
See application file for complete search history.

(56) References Cited

U.S. PATENT DOCUMENTS

| | | |
|---|---|---|
| 6,239,794 B1 | 5/2001 | Yuen et al. |
| 6,353,840 B2 | 3/2002 | Saito et al. |
| 6,564,378 B1 | 5/2003 | Satterfield et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,768,050 B2 | 7/2014 | Kannan et al. |
| 2002/0174430 A1 | 11/2002 | Ellis et al. |
| 2005/0251827 A1 | 11/2005 | Ellis et al. |
| 2009/0177959 A1 | 7/2009 | Chakrabarti et al. |
| 2010/0138402 A1 | 6/2010 | Burroughs et al. |
| 2010/0153885 A1 | 6/2010 | Yates |

(Continued)

OTHER PUBLICATIONS

International Search Report and Written Opinion in PCT/US2018/065732 dated Apr. 3, 2019.

*Primary Examiner* — John R Schnurr
(74) *Attorney, Agent, or Firm* — Haley Guiliano LLP

(57) ABSTRACT

Methods and systems are disclosed herein for accurately training a machine learning model with a reduced training data set. A large number of data records may be parsed. Each record may be reduced to a set of symbols representing the composition of each record. A user may assign a classification to each symbol within each record. Records with identical arrangements and classifications of symbols may be grouped together, and a representative sample of data records from each group may be fed into the model as the reduced training data set.

20 Claims, 10 Drawing Sheets

(56) References Cited

U.S. PATENT DOCUMENTS

| | | | |
|---|---|---|---|
| 2013/0067319 A1 | 3/2013 | Olszewski et al. | |
| 2014/0053197 A1* | 2/2014 | Shoykher | G06F 3/0481 |
| | | | 725/41 |
| 2015/0156548 A1* | 6/2015 | Sirpal | H04N 21/4788 |
| | | | 725/47 |
| 2016/0078245 A1 | 3/2016 | Amarendran et al. | |
| 2019/0156193 A1* | 5/2019 | Jaroch | G06K 9/6263 |
| 2019/0349399 A1* | 11/2019 | Liu | G06N 20/00 |

* cited by examiner

502 — 7:00 – 7:30 PM  *Comedy* — 504
506 — The Simpsons  TV-14 — 514
508 — Kamp Krusty  CC HD — 516
510 — During summer vacation, Bart and Lisa attend Kamp Krusty, a summer camp named after Krusty the Clown. The camp is extremely unpleasant, leading the campers to rebel against the camp director. (Repeat) — 512

7:30 – 8:00 PM  *Comedy*
Fresh Off the Boat  TV-PG
B as in Best Friends  CC HD
The Huangs move in with Honey and Marvin. Meanwhile, Jessica gets to compete on "Wheel of Fortune"; Eddie starts high school; and Michael Bolton offers to help out at the restaurant to give Louis more time with his family. (New)

FIG. 5

METHODS AND SYSTEMS FOR TRAINING A MACHINE LEARNING SYSTEM USING A REDUCED DATA SET

BACKGROUND

Interactive program guide listings data may be organized in a particular format to be used by a media guide listings server. Such servers may package listings for each region and subscription level. While data from a single source may generally be in a single format, a media guide listings server may receive listings data from multiple sources, each source providing data in a different format. Additionally, listings may be retrieved from printed media or other non-structed sources. For each data source, a different data import method may be required to store all the data in a single format. A machine learning model may parse program guide listings data. However, machine learning models often require large data sets for training purposes before producing accurate results.

SUMMARY

Methods and systems are described herein to train a machine learning model quickly, using only a small representative group of data records, while still achieving accuracy. Each data record of a set of data records is parsed individually by a media guidance application into a plurality of subsets of the total sequence of characters which comprises the data record. For example, given the data record "Top Gun (1986) PG-13", the media guidance application may generate the following subsets of characters: "Top Gun", "(1986)", "PG-13". The media guidance application may associate a symbol with each subset, and determine an arrangement of symbols across the entire data record. For example, the media guidance application associates the symbol "/a" with the subset "Top Gun", the symbol "/n" with the subset "(1986)", and the symbol "/b" with the subset "PG-13". The media guidance application may request or receive user input to classify each symbol in the arrangement of symbols. User classifications of symbols in a small set of records may result in faster and more efficient training of the machine learning model by reducing the amount of deductive logical processing required by the model. For example, for the record "Top Gun (1986) PG-13", the media guidance application may, using user input, classify the symbol "/a" corresponding to the subset "Top Gun" as a program title, the symbol "/n" as a release year of the program, and the symbol "/b" as the rating of the program. The media guidance application may group records with identical arrangements and classifications of symbols together. For example, the record "Star Wars (1977) PG-13" would have an identical arrangement of symbols and classifications thereof to the record "Top Gun (1986) PG-13". The media guidance application may therefore place both records in the same group. The record "Psycho R 1960 (Thriller)" would have a different arrangement of symbols and classifications, and the media guidance application may place it in a different group. After parsing all records, the media guidance application feeds a representative sample of records from each group into the machine learning model as training data.

In some embodiments, the proportion of records from each group fed into the model is maintained according to the proportion of records from each group in the set of data records. For example, the media guidance application may place ten records in a first group and five records in a second group. The media guidance application may therefore feed two records from the first group and one record from the second group into the model.

In some embodiments, the arrangement of the symbols is a summarized representation of the data record. For example, the symbol arrangement "/a /n /b" is a summarized representation of the record "Top Gun (1986) PG-13", while the symbol arrangement "/a /a /n /a" is a summarized representation of the record "Psycho R 1960 (Thriller)".

In some embodiments, the symbols are presented to the user for classification. The media guidance application feeds the user-specified classifications for each group into the model as training data along with the representative data records from each group. For example, in addition to feeding the record "Top Gun (1986) PG-13" into the model, the media guidance application also feeds the classifications "/a"=program title, "/n"=release year, and "/b"=program rating into the model.

In some embodiments, the media guidance application may present a second user with the classifications specified by a first user in order to verify the classifications entered by the first user prior to feeding the data records into the model. For example, the media guidance application, based on user input from the first user, classifies the symbol "/a" in the record "Top Gun (1986) PG-13" as an episode title, rather than a program title. The media guidance application may present this classification to the second user and, based on input from the second user, the media guidance application may reclassify the symbol "/a" as a program title.

In some embodiments, the media guidance application extracts textual information and visual clues from the data records. The media guidance application translates the visual clues into a descriptive vector associated with each data record, and feeds the descriptive vector into the model as part of the training data. For example, the record "Top Gun (1986) PG-13" may be obtained from a print source, such as a newspaper, through use of an optical scanner, camera, character recognition module, or other component, implemented in software or hardware, suitable for inputting printed media into a digital computing environment. The three subsets of the record, "Top Gun", "(1986)", and "PG-13", may each appear differently from each other. The media guidance application may extract each subset using the visual differences between each subset, and identify textual information of each subset, such as capitalization, parentheses, and punctuation. The media guidance application may use this information to create a descriptive vector in which each subset is identified with by its visual and textual characteristics. User input may be received by the media guidance application classifying each subset based on the respective visual and textual characteristics of each subset. For example, classification of the subset "Top Gun" as a program title may be based at least in part on the size or style of the text.

In some embodiments, the visual clues considered by the media guidance application include text color, bold font, italics, underlining, text size, indentations, spacing, graphics, icons, and glyphs. For example, the words "Top Gun" in the listing "Top Gun (1986) PG-13" may appear in bold type and in a larger size than "(1986)" and "PG-13", and "PG-13" may appear in italics. Using these visual clues, the media guidance application may generate a descriptive vector identifying a first subset of the record having larger size and bolded text, a second subset having a smaller size and no styling (e.g., bold, italics, or underlining), and a third subset having italicized text. The media guidance application may assign a symbol to each of the subsets identifying the type of characters contained therein, and may do so either during or after the process of generating the descriptive vector. The media guidance application may then present the record to the user for classification. The classification entered by the user may be based on the characteristics of the subset. For example, the user may classify the subset "Top Gun" as a program title based on the visual differences between the subset "Top Gun" and the other subsets. Subsequently, the media guidance application may then receive the listing "Star Wars (1977) PG" in which the words "Star Wars" appears in bold type and in a larger size than "(1977)" and "PG", and "PG" appears in italics. The media guidance application may generate a new descriptive vector, or apply the descriptive vector generated for the "Top Gun" record above. Using the descriptive vector, the media guidance application may identify the three subsets "Star Wars", "(1977)", and "PG" and assign symbols thereto. After presenting the subsets to the user for classification, the media guidance application may identify the arrangement of symbols and classifications thereof as identical to the arrangement and classifications of symbols for the previous record, "Top Gun (1986) PG-13", and group the two records together.

In some embodiments, only one descriptive vector is translated for the visual clues from each group of data records. For example, the media guidance application may process, classify, and group together the records "Top Gun (1986) PG-13" and "Star Wars (1977) PG" as well as one hundred other records with identical arrangement and classifications of symbols. The media guidance application may only generate one descriptive vector for the entire group, rather than for each individual record in the group.

In some embodiments, the characters included in each data record may be alphanumeric symbols, numbers, punctuations, scientific operators, non-Latin scripts, and Unicode symbols. For example, the record "Star Wars: The Empire Strikes Back, Mark Hamill+Harrison Ford+Carrie Fisher-||George Lucas, SciFi/Action, (1980)." contains alphanumeric symbols (e.g., parentheses), letters, numbers, punctuation (e.g., a colon) and scientific operators (e.g., "+" and "|").

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 is an exemplary listing source that is not formatted to be parsed by a computer according to an embodiment of the disclosure;

DETAILED DESCRIPTION

Figure 1:
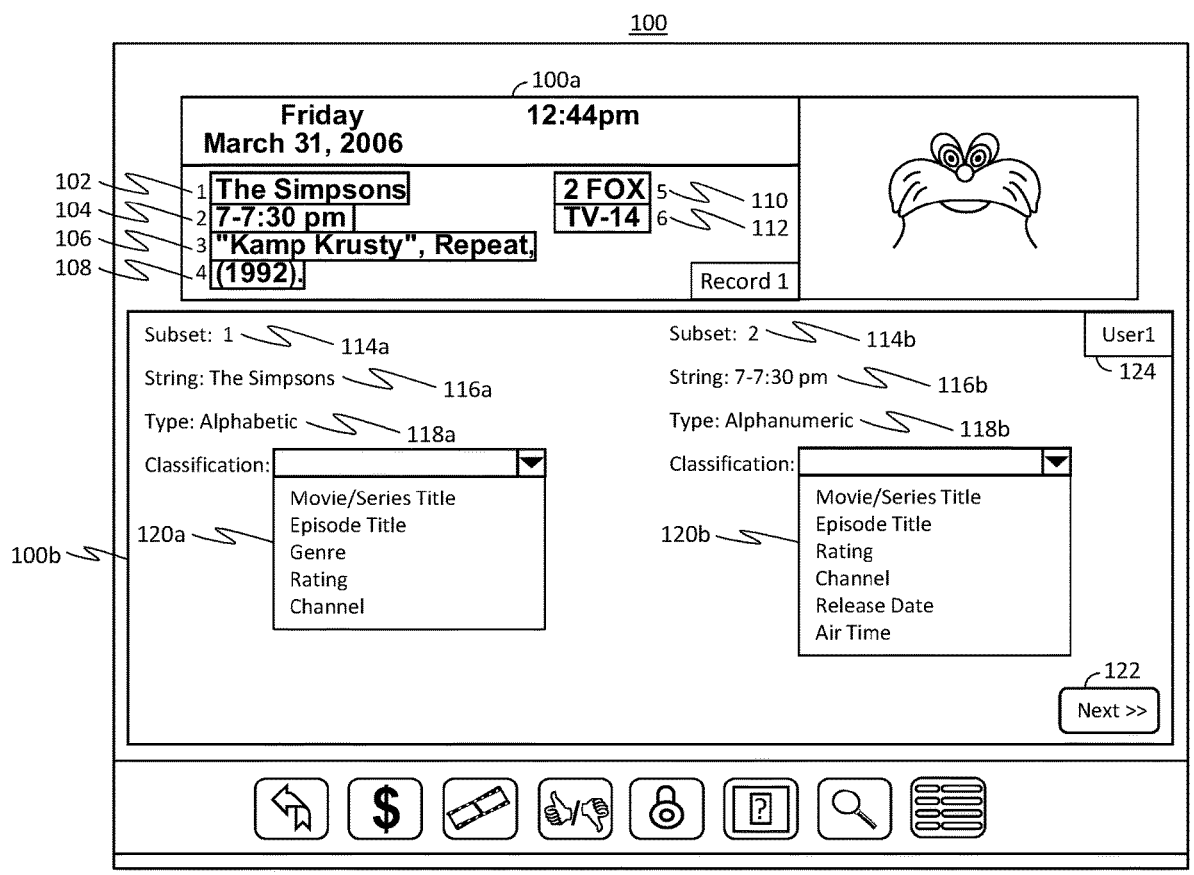
FIG. 1 shows a specific implementation of user interface for classifying subsets of a data record according to an embodiment of the disclosure.

A machine learning model may be trained quickly, using only a small representative group of data records, while still achieving accuracy. Each data record of a set of data records may be parsed into a plurality of subsets of the total sequence of characters which comprises the data record. For example, parsing the data record "Top Gun (1986) PG-13" may result in the following subsets of characters: "Top Gun", "(1986)", "PG-13". The types of characters in each subset may be detected, and a symbol associated with each subset based on the character type. A symbol, as used in this context, refers to an indicator understood by the media guidance application to represent a specific type of character or set of characters contained within a subset. For example, the symbol "/a", indicating alphabetic characters, may be associated with the subset "Top Gun", the symbol "/b", indicating both alphabetic and numeric characters, may be associated with the subset "PG-13", and the symbol "/n", indicating numeric characters, may be associated with the subset "(1986)". Other symbols may be used to indicate non-Latin scripts, glyphs, or other specialized characters. The arrangement of the symbols across the entire data record may be determined. User input may be requested or received for classifying each symbol in the arrangement of symbols. For example, for the record "Top Gun (1986) PG-13", the symbol "/a" corresponding to the subset "Top Gun" may be classified, using user input, as a program title, the symbol "/n" corresponding to "(1986)" as a release year of the program, and the symbol "/b" corresponding to "PG-13" as the rating of the program. Records with identical arrangements and classifications of symbols may be grouped together. For example, the record "Star Wars (1977) PG-13" would have an identical arrangement of symbols and classifications thereof to the record "Top Gun (1986) PG-13". Both records may therefore be placed in the same group. The record "Psycho R 1960 (Thriller)" would have a different arrangement of symbols and classifications, and may be placed in a different group. After parsing all records, a representative sample of records from each group may be fed into the machine learning model as training data.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Interactive program guide listings data may be organized in a format or data structure that can be easily parsed by a media guide listings server (e.g., media guidance data source 918). A media guide listings server may be able to efficiently package listings for each region and subscription level served by the media guide listings server. While data from a single source may generally be in a single format or sequence, a media guide listings server may accumulate, access, request, or receive media guide data from multiple sources, each source providing data in a different format or sequence. For example, a first data source may provide listings data in a flat file format with the sequence [TITLE] [AIR DATE] [AIR TIME] [EPISODE TITLE] [RATING] [RELEASE DATE] for each entry, while a second data source may provide listings data in a flat file format with the sequence [AIR DATE] [AIR TIME] [TITLE] [EPISODE TITLE] [RELEASE DATE] [RATING] for each entry. Thus, for each data source, a different data import method may be required in order to store all the data in a single format or data structure. Additionally, listings data may be received in a non-structured form. For example, listings data may be extracted from an Internet webpage as formatted text, or extracted from print media, such as newspapers or magazines, using imaging and optical character recognition techniques. An additional import method would then be required to parse the webpage formatted text to extract listings data, and yet another import method would be needed to extract listings data from the print media sources.

A machine learning model may quickly parse and classify data received or extracted from multiple sources in multiple formats. However, machine learning models often require large data sets for training purposes before being able to produce accurate results. Thus, it would be advantageous to be able to train a machine learning model quickly, using only a small representative group of data records, while still achieving accuracy.

In order to prepare a representative group of data records for training purposes, a set of data records must first be processed. Processing the data records may include parsing each record to obtain a plurality of subsets, and classifying each subset. User input may be used to classify each subset. Subsets may be displayed to a user via a user interface. User classification of subsets may result in faster and more efficient training of the machine learning model by reducing the amount of deductive logical processing required to process and learn from each record.

A media guidance application may receive, retrieve, or otherwise access data records from multiple sources. For example, the media guidance application may automatically receive records from a broadcasting company (e.g., NBC) on a weekly basis. The media guidance application may also actively request records from a broadcasting company when necessary. The records received by the media guidance application contain program listings. The records may be in any format, chosen by the broadcasting company. For example, records may be contained in a database, a flat file, an array, a matrix, or any other data structure or file format. As a result, the media guidance application must parse records received from each source separately, to account for the file format or data structure used by each source. Additionally, records may be received from non-structured, or non-electronic sources, such as websites, or printed listings in newspapers.

The media guidance application may process the records from each structured electronic source (i.e., database, flat file, array, matrix, or other data structure) using the same method to identify the general structure of each listing. For each record (e.g., program listing), the media guidance application first parses the record to obtain a number of subsets. The subsets may be identified by text delimiters, database fields, array or matrix entries, or any other method suitable for extracting subsets of text from the file format or data structure being processed. As the media guidance application parses the data record, it may, for example, first detect special characters such as tabs, carriage returns and line feeds to determine subset boundaries. In some embodiments, other characters such as punctuation marks (e.g., commas, periods, semicolons) and spaces may be used to determine subset boundaries. In some embodiments, as will be discussed below with reference to FIG. 2, using punctuation marks as delimiters between subsets may be determined by a user on a case by case basis, as some fields such as the program title may include punctuation marks.

The media guidance application may also process the records from each non-structured or non-electronic source using visual clues. For example, each record of a set of records on a website may be presented using a variety of text colors, size, styles, and fonts. For example, the records "Top Gun (1986) PG-13" may be presented with "Top Gun" in bold type and in a larger size than "(1986)" and "PG-13", and "PG-13" may be presented in italics. The media guidance application may be configured to identify each portion of the text based on its appearance and generate a subset for each identified portion.

Once a record has been parsed into a number of subsets, the media guidance application may assign a symbol to each subset indicating the type of characters contained within the subset. A symbol may be a particular character or set of characters which the media guidance application is configured to recognize as an indicator of character types. For example, the symbol "/a" may represent alphabetic characters, the symbol "/n" may represent numeric characters, and the symbol "/b" may represent both alphabetic and numeric characters within a single subset (e.g., "PG-13"). The media guidance application may be configured to detect the type of characters within a subset in a number of ways, such as by using regular expressions to determine if certain types of characters are present within the subset, or by analyzing the ASCII or Unicode value of each character.

After assigning a symbol to each subset, the media guidance application presents each subset to a user for classification. The media guidance application may also simultaneously present the entire record in order to provide the user with any context information needed to understand what each subset represents. The media guidance application may present the subsets and the record to a user via a user interface.

The user interface shown in FIG. 1 is an exemplary user interface screen 100 of a media guidance application for preparing data sets for training a machine learning model according to an embodiment of the disclosure. In a first portion 100*a* of user interface screen 100, the media guidance application displays a listings data record, such as "The Simpsons, 7-7:30 pm, "Kamp Krusty", Repeat, (1992). 2 FOX, TV-14". The media guidance application may parse the data listing to identify various subsets of data as distinct portions of the listing. For example, the media guidance application may determine that subset 102, "The Simpsons", is a first portion of the listing, and may display a bounding box surrounding the character string of the portion, and an identifying numeral ("1" in the case of subset 102). Each of subsets 102, 104, 106, 108, 110, and 112 may be noted by such boxes and identifying numerals.

A second portion 100*b* of user interface screen 100 of the media guidance application is used to display graphical user interface elements generated by the media guidance application, which allow a user to review and classify the various subsets of the sequence of characters that make up the program listing. For example, the media guidance application may display interface screen portion 100*b* including a number of fields that are automatically populated relating to the structure and composition of each subset. Interface screen portion 100*b* may also include static and interactive fields for a user to classify the data in each subset. For example, the media guidance application may automatically populate interface screen portion 100*b*, including subset identifier fields 114*a*, 114*b*, subset string fields 116*a*, 116*b*, and subset character type fields 118*a*, 118*b*. The media guidance application may assign each identified subset a numeral identifier. The media guidance application may display the identifiers in interface screen portion 100*a*, and may use them to refer to each respective subset in interface screen portion 100*b*. For example, subset identifier field 114*a* identifies Subset 1 102. Subset string field 116*a* displays the characters "The Simpsons" which comprise Subset 1 102. After identifying a subset, the media guidance application may note the types of characters included in the subset. The type of characters may be alphanumeric, alphabetic, numeric, or any other type of character such as non-Latin characters, Unicode characters, and visual glyphs. The media guidance application may additionally detect and note whether any or all of the alphabetic characters contained in each subset are capitalized. The media guidance application displays the type of characters in subset character type field 118a.

The media guidance application may also display, as shown in interface screen portion 100b, interactive classification fields 120a, 120b. The media guidance application may accept user input for classification fields 120a, 120b by way of user input interface 810. In some embodiments, classification field 120a is a dropdown menu containing multiple options from which the user may select the appropriate classification. In some embodiments, the options included by the media guidance application in the dropdown menu of classification fields 120a, 120b may be dynamically populated based on the value of the subset character type field. For example, as shown in FIG. 1, subset character type field 118a of Subset 1 is "Alphabetic." The options included in dropdown menu 120a reflect classifications with character types that are generally alphabetic characters only, such as program or episode title, genre, rating, and channel. Subset 2 104 has a subset character type 118b of "Alphanumeric," and the dropdown menu 120b includes options that reflect classifications with character types that are generally alphanumeric characters, such as rating, channel, release date, and air time, as well as program and episode title, as these may sometimes include both letters and numbers.

In some embodiments, the media guidance application may also display the symbol assigned to the subset. The media guidance application may then allow a user to classify the symbol, or to add custom symbols to specific character patterns. For example, Subset 2 104 comprises the characters "7-7:30 pm" and may be assigned the symbol "/b", indicating that the characters comprising the subset are alphanumeric. The user may directly classify the "/b" symbol as air time. The user may alternatively create a new symbol, for example "/t", as an indicator for air time, and instruct the media guidance application to assign the symbol "/t" to all subsets with a pattern of alphanumeric characters matching a character expression such as "#[#][:##][ ]-[ ]#[#][:##][ ][@m]", where "#" indicates a number, "@" indicates a letter, and characters placed in brackets are optional. Thus, the subsets "7:00-7:30 pm", "7-7:30 pm", "7-7:30 pm", "7-8 pm", and "7-8" would all match the character expression and be assigned the symbol "/t".

The media guidance application may also display, as shown in interface screen portion 100b, a username indicator 124 showing which user is currently providing input. As will be discussed below with reference to FIG. 4, additional users may review the classifications selected by a first user in order to verify them. The media guidance application may also include, in interface screen portion 100b, a navigation control, such as "Next" button 122. Such navigation controls, accessed using user input interface 810, may allow a user to page through the identified subsets in order to apply classifications to each subset. The interface screen portion 100b may not be large enough to display fields for all subsets simultaneously. For example, as shown in FIGS. 1-4, interface screen portion 100b is large enough only to show fields for two subsets at a time.

Once the media guidance application has received user input classifying all of the subsets shown in interface screen portion 100b, the media guidance application may accept user selection of "Next" button 122 to navigate to the next page of subsets by way of user input interface 810. The media guidance application may maintain a database, table, or other data structure for each record to be processed, in which entries are created for each symbol in the arrangement of symbols in the record to be classified. Upon selection of the "Next" button 122, the media guidance application may store the classifications entered for each displayed subset in the entry in the table, database, or data structure for the symbol corresponding to each classified sub set.

Figure 2:
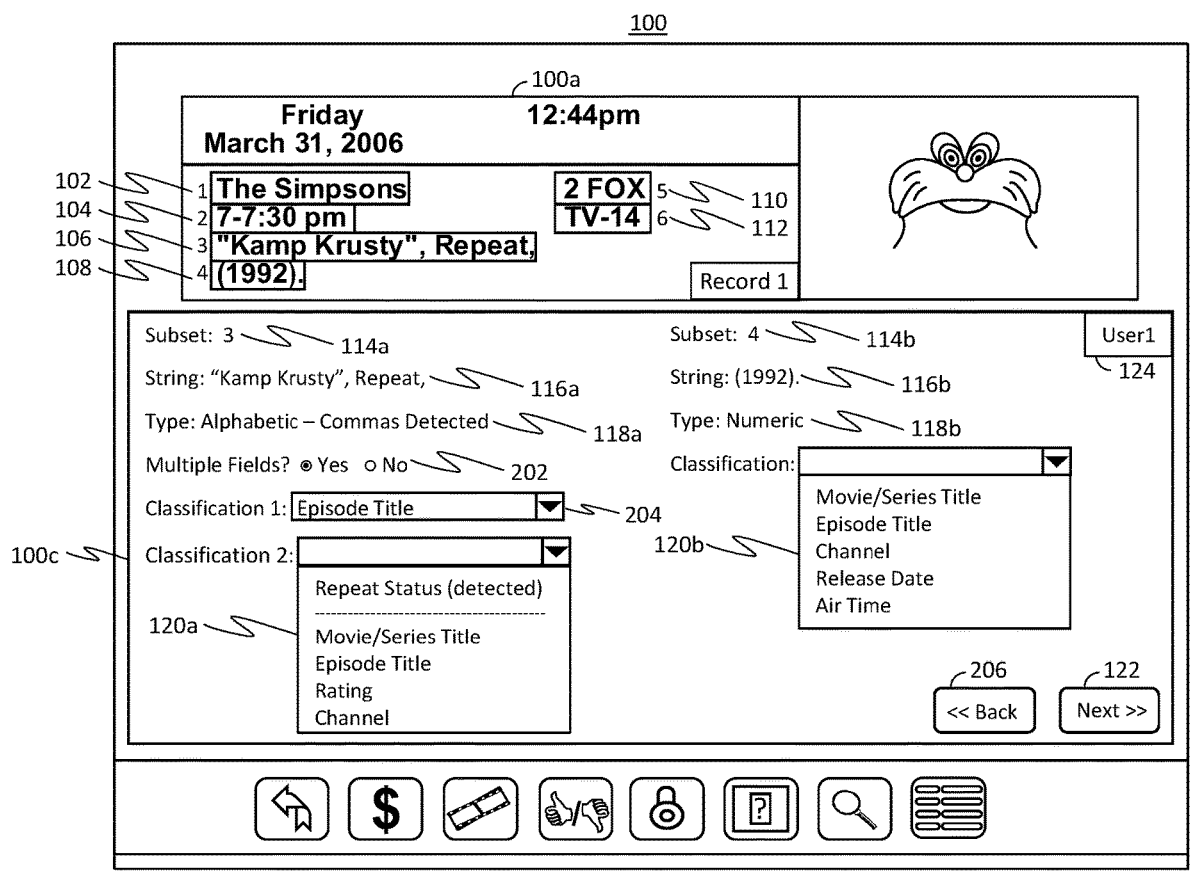
FIG. 2 shows a specific implementation of user interface for classifying subsets of a data record according to an embodiment of the disclosure.

FIG. 2 is an exemplary interface screen of the media guidance application similar to that shown in FIG. 1 as described above. The media guidance application may display, as shown in interface screen portion 100c, fields relating to further subsets. In addition to the fields described above with reference to FIG. 1, the media guidance application may display an interactive "Multiple Fields?" selection element 202. In the exemplary embodiment of FIG. 2, Subset 3 106 comprises the string ""Kamp Krusty", Repeat," which includes at least one comma. In parsing the data record, the media guidance application may detect the presence of a comma and present this selection element to the user. The media guidance application may also provide an indication of the detection as part of the subset character type 118a. The media guidance application may detect, from user input interface 810, a user selection of "Yes" from the multiple fields selection element 202, indicating that the commas detected in the subset string should be used as delimiters between fields in the record. This cannot be done automatically, as some program and/or episode titles may include a comma. In response to detecting the selection, the media guidance application may also display additional classification field 204, through which user input classifying each part of the subset may be received via user input interface 810.

The media guidance application may automatically detect certain words that are common values for a specific field. For example, the media guidance application may automatically detect the second part of Subset 3 106, "Repeat," as a new/repeat status flag. The media guidance application may display the classification corresponding to the automatically detected flag as a first option in dropdown menu 120a. The media guidance application may also ignore or separately process certain characters such as parentheses. For example, Subset 4 108 comprises the string "(1992)." which includes parentheses. The media guidance application may detect that the primary portion of the character string is numeric only, and that the parentheses are secondary elements which may be ignored for classification purposes. Thus, the media guidance program displays a value of "Numeric" for subset character type field 118b.

Once the media guidance application has completed classifying the subsets shown in interface screen portion 100c, the media guidance application may accept user input to navigate to the next page of subsets through of selection of "Next" button 122 or to navigate back to the previous page of subsets through selection of "Back" button 206 by way of user input interface 810.

Figure 3:
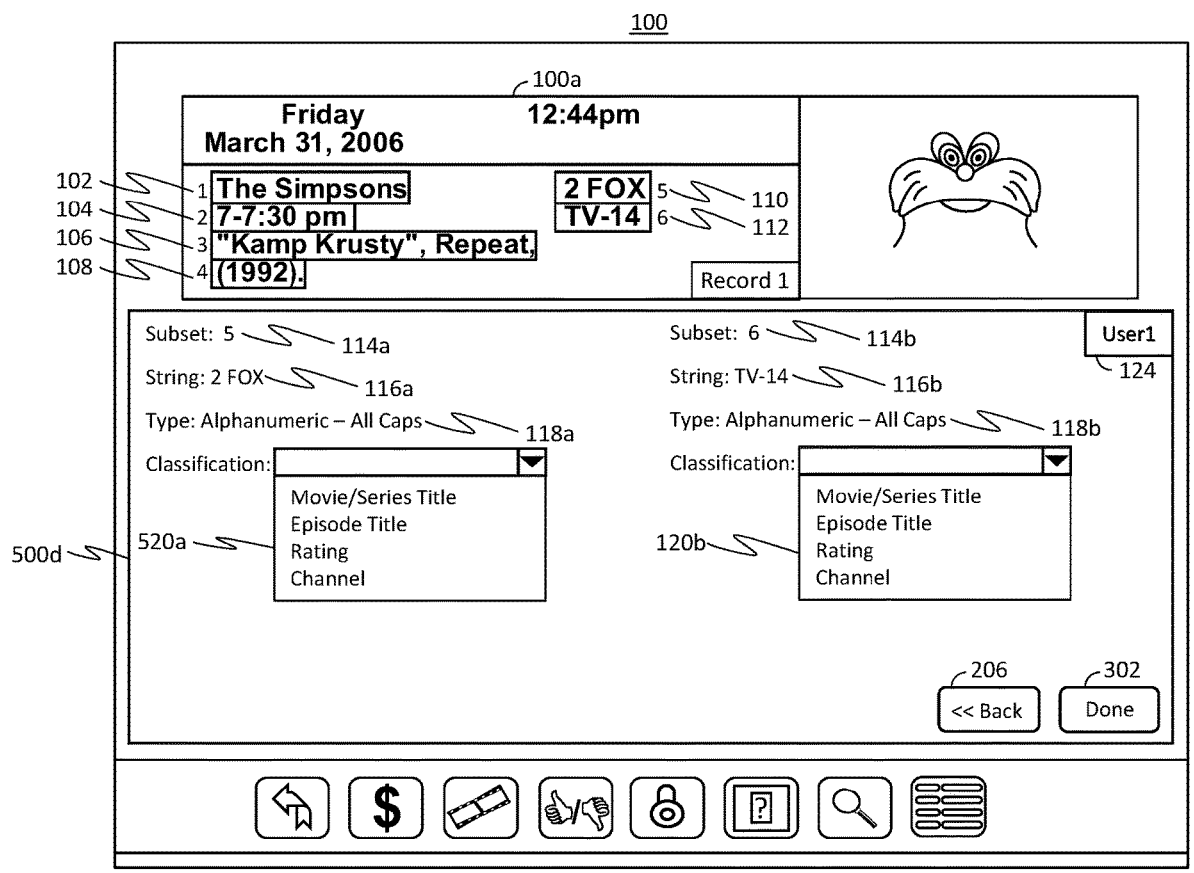
FIG. 3 shows a specific implementation of user interface for classifying subsets of a data record according to an embodiment of the disclosure.

FIG. 3 in an exemplary interface screen of the media guidance application similar to that shown in FIGS. 1 and 2 as described above. The media guidance application may display, in interface screen portion 100d, fields relating to further subsets. In the exemplary embodiment of FIG. 3, Subset 5 110 comprises the string "2 FOX" and Subset 6 112 comprises the string "TV-14", both of which contain both letters and numbers. The media guidance application may detect these as alphanumeric strings. The media guidance application may further detect that all the alphabetic characters contained in Subset 5 110 are capitalized. This may be noted in the subset character type fields 118a and 118b, which in the exemplary embodiment of FIG. 3 have a value of "Alphanumeric—All Caps". The media guidance application may include as options in dropdown menus 120a and 120*b* classification options with character types that are generally alphanumeric characters which appear in all caps, such as rating, and channel, as well as program and episode title which may be any character type. In the exemplary embodiment of FIGS. 1-3, interface screen portion 100*d* contains the last subset. When the media guidance application displays the interface screen portion containing the last subset, the "Next" button 122 is replaced by a "Done" button 302. In response to detecting a user selection of the "Done" button via the user input interface 810, the media guidance application may not accept any further user input for the currently-displayed record. To return to previous subsets already classified, user selection of "Back" button 206, via user input interface 810, may be accepted by the media guidance application.

After selection of the "Done" button 302, the media guidance application may proceed to place the record into a group with other records based on the arrangement of symbols in the record and the classifications received from the user. If the current record is the first record to be processed, the record is placed into a first group. The media guidance application may maintain a database or other data structure in which the arrangement and classification of symbols in each group are recorded. In placing the first record into a first group, the media guidance application may also add an entry in the database for the first group, indicating the specific arrangement of symbols and classifications thereof which define the group. For all subsequent records, the media guidance application may compare the arrangement of symbols and the classifications thereof to those of each existing group, using the database entries for each group. If the arrangement and classification of symbols in the current record match the arrangement and classification of symbols in a pre-existing group, the current record is added to that group. If the arrangement and classification of symbols in the current record does not match any pre-existing group, a new group is created and the current record is added to the new group, and a new database entry is added detailing the arrangement and classification of symbols defining the new group.

Figure 4:
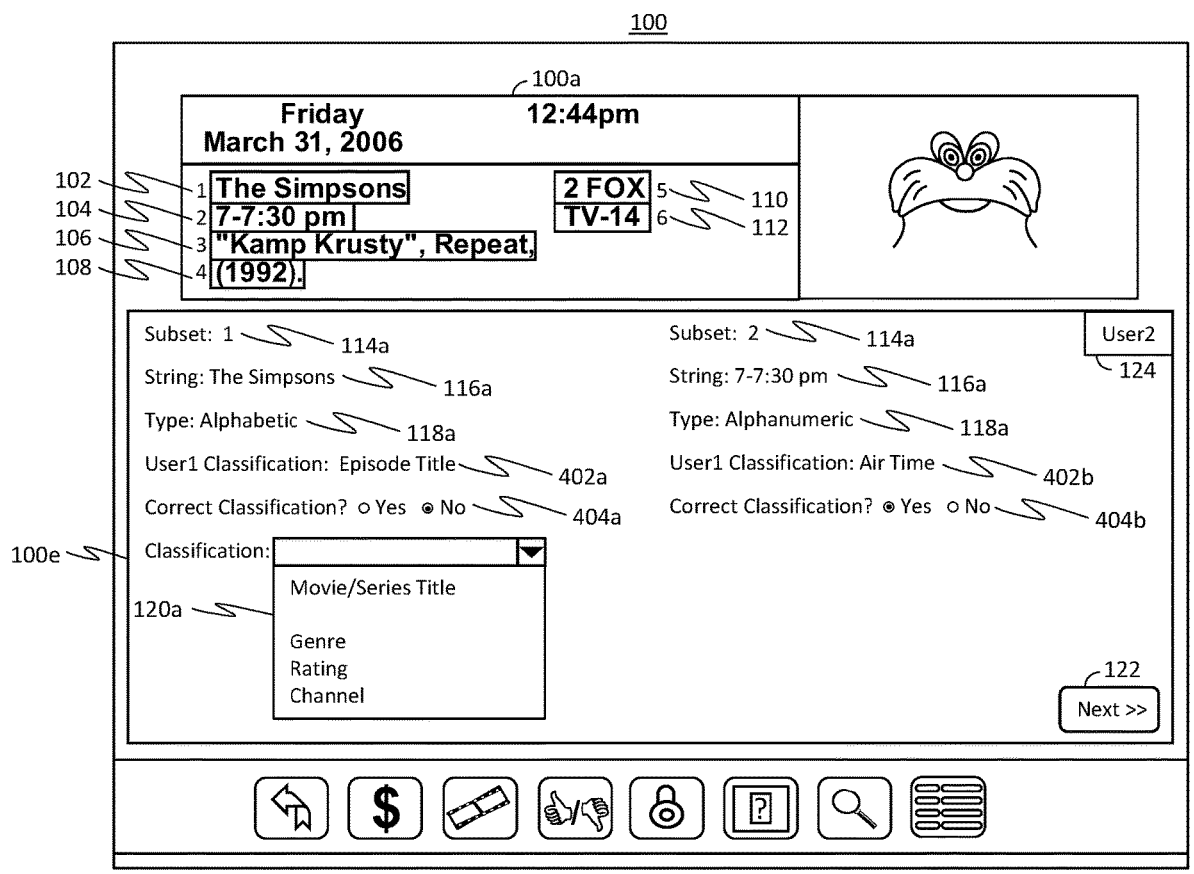
FIG. 4 shows a specific implementation of user interface for verifying classifications of subsets of a data record according to an embodiment of the disclosure.

In some embodiments, the media guidance application may present for review by a second user the classifications made by a first user, in order to verify the classifications. FIG. 4 is an exemplary interface screen of the media guidance application similar to that shown in FIG. 1 as described above. In addition to the fields included in FIG. 1, the media guidance application may display interface screen portion 100*e* showing previous user classification fields 402*a*, 402*b*. In the exemplary embodiment shown in FIGS. 1-4, the user "User1" entered a classification for Subset 1 of "Episode Title". The media guidance application may also display, as shown in interface screen portion 100*e*, interactive "Correct Classification?" selection elements 404*a*, 404*b*. In response to detecting, through user input interface 810, a user selection of "No" from the correct classification selection element 404*a*, the media guidance application displays a classification dropdown menu (e.g., classification dropdown 120*a*). The media guidance application may also disable as a selection option from classification dropdown 120*a* the classification entered by the previous user, thereby preventing the second user from selecting the incorrect classification again. Based on user selection of navigation button 122, 202, and 302 via user input interface 810, the media guidance application may progress through the various subset until all subsets have been verified.

Figure 6:
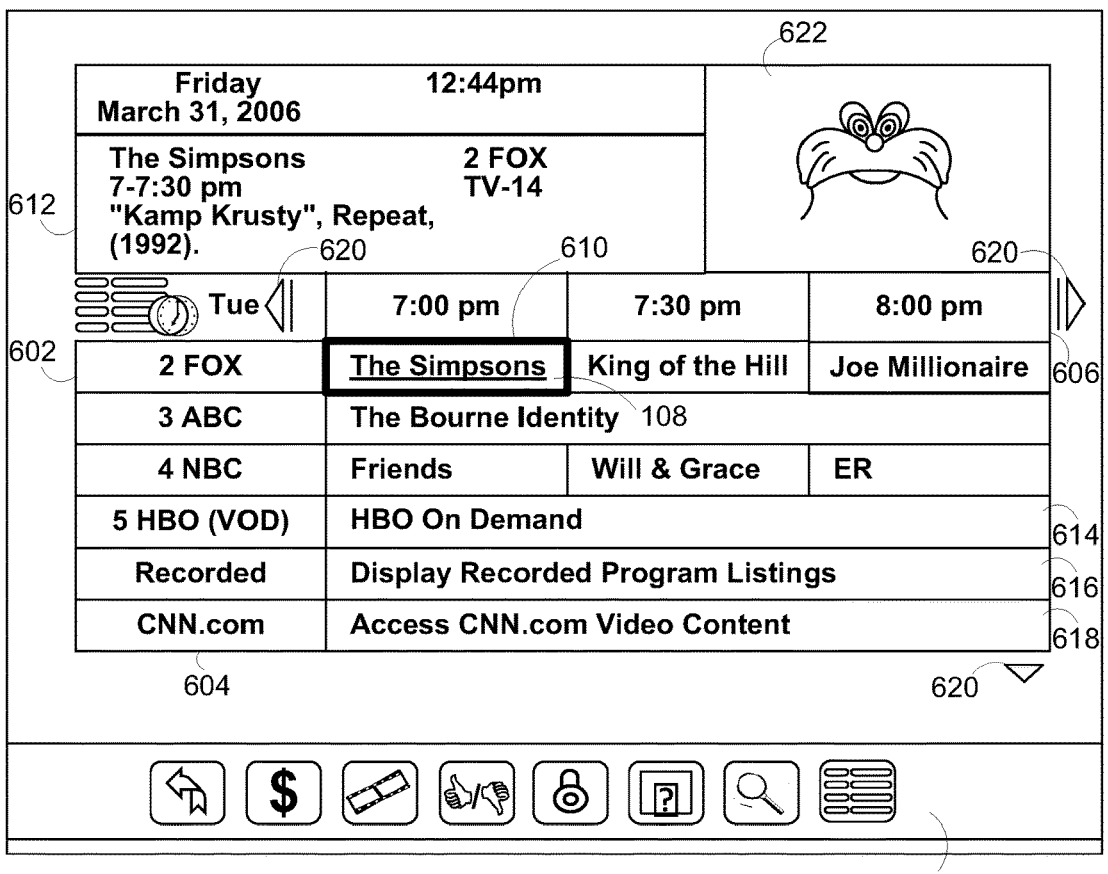
FIG. 6 shows an illustrative display screen that may be used to provide media guidance data according to an embodiment of the disclosure.
Figure 7:
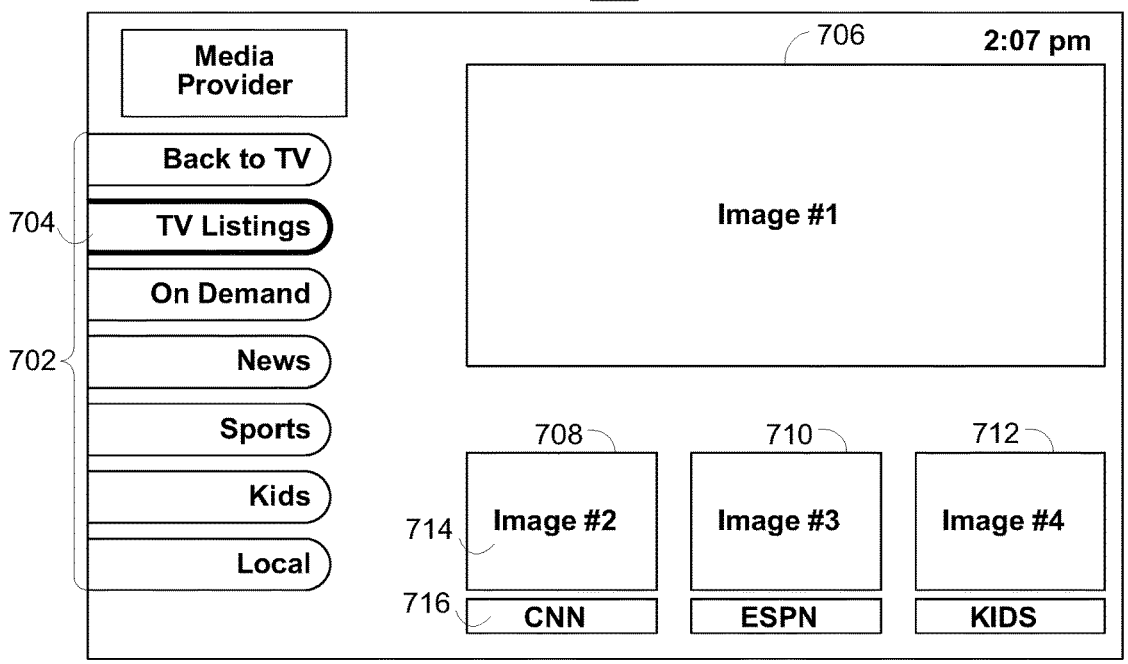
FIG. 7 shows an illustrative display screen that may be used to provide media guidance data according to an embodiment of the disclosure.

FIGS. 6-7 show illustrative display screens that may be used to provide media guidance data. The display screens shown in FIGS. 6-7 may be implemented on any suitable user equipment device or platform. While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Some non-linear programming is provided by OTT applications. If an OTT non-linear program is selected from the interactive program guide, a set-top box may instruct a second device to launch the OTT application and access the selected program for output to a display. Other programs may be accessible directly by the set-top box. Such programs may be received by the set-top box and routed through the second device for display.

Grid 602 may provide media guidance data for non-linear programming including on-demand listing 614, recorded content listing 616, and Internet content listing 618. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, and 618 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. Pressing an arrow key on a user input device may affect the display in a similar manner as selecting navigational icons 620.

Display 600 may also include video region 622, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 700 includes selectable options 702 for content information organized based on content type, genre, and/or other organization criteria. In display 700, television listings option 704 is selected, thus providing listings 706, 708, 710, and 712 as broadcast program listings. In display 700 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 708 may include more than one portion, including media portion 714 and text portion 716. Media portion 714 and/or text portion 716 may be selectable to view content in full-screen or to view information related to the content displayed in media portion 714 (e.g., to view listings for the channel that the video is displayed on).

The listings in display 700 are of different sizes (i.e., listing 706 is larger than listings 708, 710, and 712), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 8:
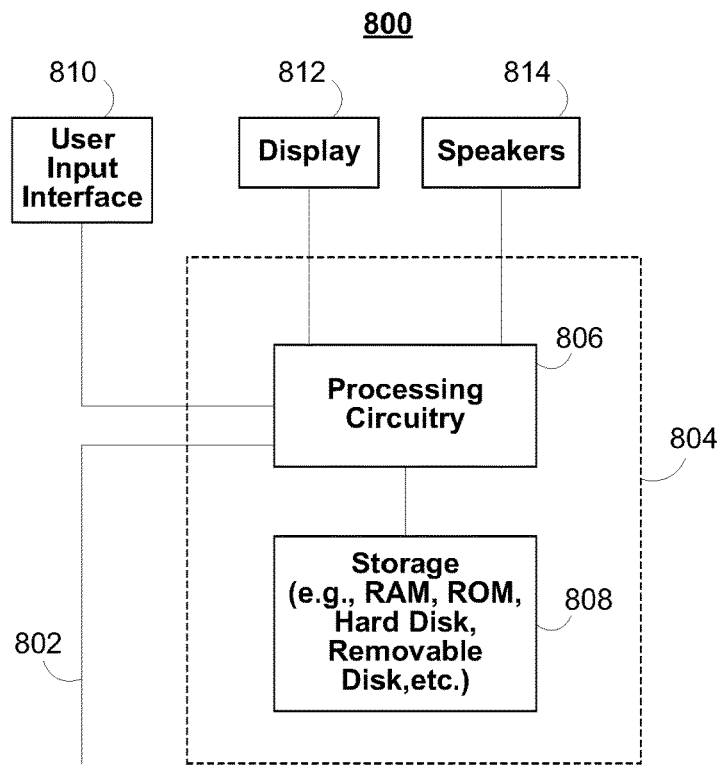
FIG. 8 shows a generalized embodiment of a stand-alone device according to an embodiment of the disclosure.

Users may access content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive content and data via input/output (hereinafter "I/O") path 802. I/O path 802 may provide content (e.g., broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media guidance application stored in memory (i.e., storage 808). Specifically, control circuitry 804 may be instructed by the media guidance application to perform the functions discussed above and below. For example, the media guidance application may provide instructions to control circuitry 804 to generate the media guidance displays. In some implementations, any action performed by control circuitry 804 may be based on instructions received from the media guidance application.

In client-server based embodiments, control circuitry 804 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 9, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of the user equipment 800. Circuitry 804 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of user equipment device 800. For example, display 812 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 812 may be HDTV-capable. In some embodiments, display 812 may be a 3D display, and the interactive media guidance application and any suitable content may be displayed in 3D. A video card or graphics card may generate the output to the display 812. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804. The video card may be integrated with the control circuitry 804. Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814.

The guidance application may be implemented using any suitable architecture. For example, it may be a stand-alone application wholly-implemented on user equipment device 800. In such an approach, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected.

In some embodiments, the media guidance application is a client-server based application. Data for use by a thick or thin client implemented on user equipment device 800 is retrieved on-demand by issuing requests to a server remote to the user equipment device 800. In one example of a client-server based guidance application, control circuitry 804 runs a web browser that interprets web pages provided by a remote server. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on equipment device 800. This way, the processing of the instructions is performed remotely by the server while the resulting displays are provided locally on equipment device 800. Equipment device 800 may receive inputs from the user via input interface 810 and transmit those inputs to the remote server for processing and generating the corresponding displays. For example, equipment device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to equipment device 800 for presentation to the user.

In some embodiments, the media guidance application is downloaded and interpreted or otherwise run by an interpreter or virtual machine (run by control circuitry 804). In some embodiments, the guidance application may be encoded in the ETV Binary Interchange Format (EBIF), received by control circuitry 804 as part of a suitable feed, and interpreted by a user agent running on control circuitry 804. For example, the guidance application may be an EBIF application. In some embodiments, the guidance application may be defined by a series of JAVA-based files that are received and run by a local virtual machine or other suitable middleware executed by control circuitry 804. In some of such embodiments (e.g., those employing MPEG-2 or other digital media encoding schemes), the guidance application may be, for example, encoded and transmitted in an MPEG-2 object carousel with the MPEG audio and video packets of a program.

Figure 9:
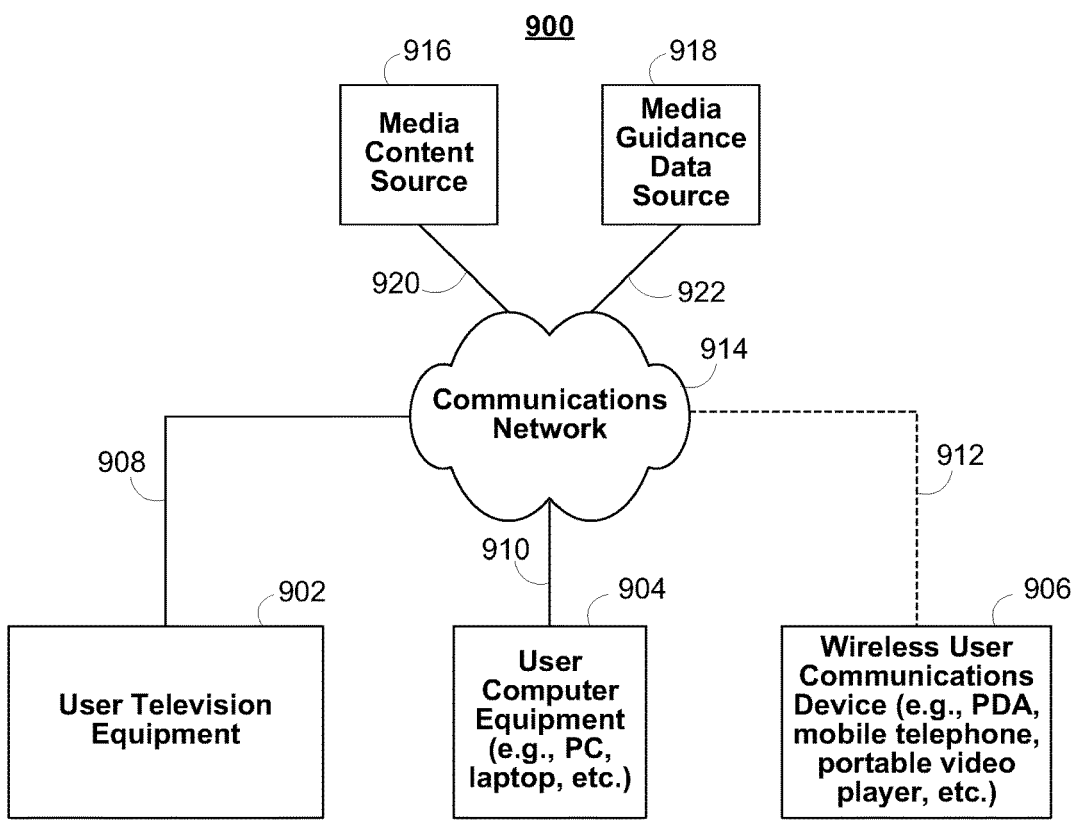
FIG. 9 shows a specific implementation of user devices according to an embodiment of the disclosure.

User equipment device 800 of FIG. 8 can be implemented in system 900 of FIG. 9 as user television equipment 902, user computer equipment 904, wireless user communications device 906, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 902, user computer equipment 904, or a wireless user communications device 906. For example, user television equipment 902 may, like some user computer equipment 904, be Internet-enabled allowing for access to Internet content, while user computer equipment 904 may, like some television equipment 902, include a tuner allowing for access to television programming. The media guidance application may have the same layout on various different types of user equipment or may be tailored to the display capabilities of the user equipment. For example, on user computer equipment 904, the guidance application may be provided as a web site accessed by a web browser. In another example, the guidance application may be scaled down for wireless user communications devices 906.

In system 900, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 902, user computer equipment 904, wireless user communications device 906) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile voice or data network (e.g., a 4G or LTE network), cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content source 916 and media guidance data source 918 coupled to communications network 914 via communication paths 920 and 922, respectively. Paths 920 and 922 may include any of the communication paths described above in connection with paths 908, 910, and 912. Communications with the content source 916 and media guidance data source 918 may be exchanged over one or more communications paths, but are shown as a single path in FIG. 9 to avoid overcomplicating the drawing. In addition, there may be more than one of each of content source 916 and media guidance data source 918, but only one of each is shown in FIG. 9 to avoid overcomplicating the drawing. The different types of each of these sources are discussed below. If desired, content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Content source 916 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 916 may be the originator of content (e.g., a television broadcaster, a Webcast provider, etc.) or may not be the originator of content (e.g., an on-demand content provider, an Internet provider of content of broadcast programs for downloading, etc.). Content source 916 may include cable sources, satellite providers, on-demand providers, Internet providers, over-the-top content providers, or other providers of content. Content source 916 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 918 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 918 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 918 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 918 may provide user equipment devices 902, 904, and 906 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 808, and executed by control circuitry 804 of a user equipment device 800. In some embodiments, media guidance applications may be client-server applications where only a client application resides on the user equipment device, and server application resides on a remote server. For example, media guidance applications may be implemented partially as a client application on control circuitry 804 of user equipment device 800 and partially on a remote server as a server application (e.g., media guidance data source 918) running on control circuitry of the remote server. When executed by control circuitry of the remote server (such as media guidance data source 918), the media guidance application may instruct the control circuitry to generate the guidance application displays and transmit the generated displays to the user equipment devices. The server application may instruct the control circuitry of the media guidance data source 918 to transmit data for storage on the user equipment. The client application may instruct control circuitry of the receiving user equipment to generate the guidance application displays.

Content and/or media guidance data delivered to user equipment devices 902, 904, and 906 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE®, NETFLIX®, and HULU®, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 900 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 916 to access content. Specifically, within a home, users of user television equipment 902 and user computer equipment 904 may access the media guidance application to navigate among and locate desirable content. Users may also access the media guidance application outside of the home using wireless user communications devices 906 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 914. These cloud resources may include one or more content sources 916 and one or more media guidance data sources 918. In addition or in the alternative, the remote computing sites may include other user equipment devices, such as user television equipment 902, user computer equipment 904, and wireless user communications device 906. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 904 or wireless user communications device 906 having content capture feature. Alternatively, the user can first transfer the content to a user equipment device, such as user computer equipment 904. The user equipment device storing the content uploads the content to the cloud using a data transmission service on communications network 914. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 10:
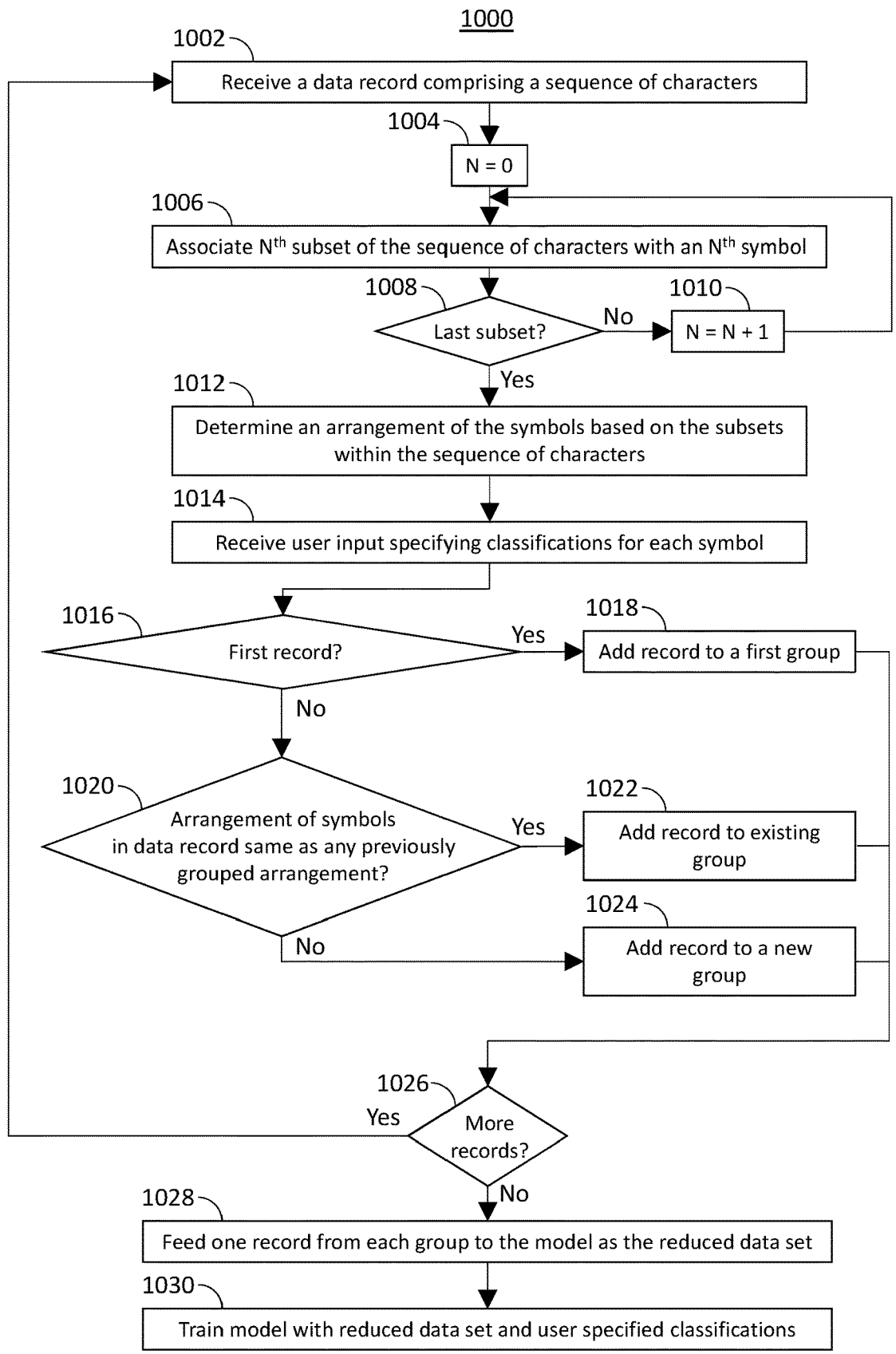
FIG. 10 is a flowchart representing a process for training a model with a reduced data set according to an embodiment of the disclosure.

The flowchart in FIG. 10 represents a process 1000 implemented on control circuitry 804 for training a machine learning model in accordance with an embodiment of the disclosure. It should be noted that process 1000 or any step thereof could be performed on, or provided by, any of the devices shown in FIGS. 8-9. For example, process 1000 may be executed by control circuitry 804 (FIG. 8) as instructed by a media guidance application implemented on a user device (e.g., user equipment devices 902, 904, and/or 906 (FIG. 9)) in order to train a machine learning model. In addition, one or more steps of process 1000 may be incorporated into or combined with one or more steps of any other process or embodiment described herein.

At step 1002, control circuitry receives a data record for a particular program listing. The data record comprises a sequence of characters, such as "The Simpsons, 7-7:30 pm, "Kamp Krusty", Repeat, (1992)." as shown in FIG. 1. The data record may be parsed into various character string subsets by the control circuitry 804.

At step 1004, control circuitry 804 may initialize a counter variable N, and set the value of N to zero. The counter variable may be used to track the number of subsets in the sequence of characters.

At step 1006, control circuitry 804 associates a symbol with a subset of characters. For example, the media guidance application may generate a table, database, or other data structure in which each symbol is recorded. An entry may be made in the data structure for each subset. The media guidance application may then add the associated symbol for each subset to its respective entry. The symbol represents the type of characters contained within the subset. For example, the symbol "/a" may be associated with a subset containing only alphabetic characters, while the symbol "/n" may be associated with a subset containing only numeric characters. A symbol "/b" may be associated with a subset containing alphanumeric characters. In some embodiments, an additional symbol (e.g., "/s") may be used to indicate symbols such as punctuation marks and parentheses. Additional pattern recognition modules of the control circuitry 804 may be configured to identify certain patterns of characters as possibly representing a specific type of information. For example, a string of four numbers without any punctuation marks or spaces between them (e.g., "2017") may be identified as possibly representing a year. Control circuitry 804 may, for example, assign a separate symbol "/y" to this subset.

At step 1008, control circuitry 804 may detect whether it has reached the last subset in the sequence of characters. For example, when the data record is received, control circuitry 804 may detect and record the number of characters comprising the sequence of characters. As each subset is detected, control circuitry 804 may further detect the total number of characters in each respective subset. Control circuitry 804 may record the number of characters in each subset separately or may keep a running total. After each subset is processed, control circuitry 804 may compare the running total with the recorded total number of characters comprising the sequence. If the running total is equal to the recorded total, then all subsets have been processed. Alternatively, control circuitry 804 may subtract the length of each subset from the recorded total number of characters comprising the sequence of characters. If the value of the recorded total number of the characters reaches zero, then all subsets have been processed. If control circuitry 804 determines that all subsets have been processed, control circuitry 804 proceeds to step 1012. If control circuitry 804 determines that not all subsets have been processed (i.e., the recorded total number of characters is greater than the number of characters in the processed, or, alternatively, the recorded total number of characters is greater than zero), then, at step 1010, the counter variable N is incremented by one, and control circuitry returns to step 1006 to associate a symbol with the next subset in the sequence of characters.

At step 1012, control circuitry 804 determines the arrangement of the symbols within the sequence of characters. For example, the sequence of characters "The Simpsons, 7-7:30 pm, "Kamp Krusty", Repeat, (1992).", shown in FIGS. 1-4 as subsets 102, 104, 106, 108, may be parsed into the subsets "The Simpsons", "7-7:30 pm", "Kamp Krusty"", "Repeat", and "(1992)." and assigned three /a symbols, one /b symbol, and one /y symbol. Control circuitry 804 may then determine the correct arrangement of the symbol to accurately represent their relative positions within the character sequence. In this example, the determined arrangement is /a, /b, /a, /a, /y. Further examples of this determination may be found below in relation to FIG. 11.

At step 1014, control circuitry 804 receives user input via user input interface 810, such as from the user interface exemplified in FIGS. 1-4, classifying each symbol in the arrangement. Methods for classifying each symbol are discussed above in relation to FIGS. 1-4. For example, classification of the symbol "/a" representing the subset "The Simpsons" may be received, classifying the symbol as a program title, and the symbol "/b" representing the subset "7-7:30 pm" as the air time of the program. Upon receiving a user classification, the media guidance application may add to the entry relating to the classified symbol in the table, database, or data structure, the classification of the symbol. After a receiving user input classifying all the symbols which comprise the sequence of characters, or after receiving user input from a second user verifying classifications received from user input by a first user, control circuitry 804 receives the classifications for adding into the training model.

At step 1016, control circuitry 804 first determines if the current record being processed is the first record being processed for the current training model. If so, then, at step 1018, control circuitry 804 adds the record to a first group of records. If the current record being processed is not the first record, then, at step 1020, control circuitry 804 determines whether the arrangement of symbols in the current record being processed is the same as any previously processed record. For example, control circuitry 804 may generate, as part of each group, a list, matrix, table, or other suitable data structure specifying the arrangement and classifications of symbols for records contained in each respective group. For example, control circuitry 804 may generate for the group containing the record "The Simpsons, 7-7:30 pm, "Kamp Krusty", Repeat, (1992)." the list "[/a|program_title], [/b|air_time], [/a|episode_title], [/a|repeat_flag], [/n|release_year]". The record "The Big Bang Theory, 8-8:30 pm, "The Retraction Reaction", New, (2017)." would have the same arrangement of symbols as the record "The Simpsons, 7-7:30 pm, "Kamp Krusty", Repeat, (1992).". These two records, at step 1022, would be placed in the same group. However, the record "Invasion!, The Flash, Repeat, 2016, 9:00-10:00 pm, Action/Adventure/Drama" would have a different arrangement of symbols (e.g., /a, /a, /a, /y, /b, /a). Control circuitry 804 may be configured to identify this arrangement of symbols as different from the arrangement of symbols in any other group and, in response to such detection, at step 1024, add the record to a new group.

At step 1026, control circuitry 804 checks if there are more records to process. If so, control circuitry 804 returns to step 1002 to process the next record. If not, then, at step 1028, control circuitry 804 feeds one record from each group into the model as a reduced data set for training purposes.

Finally, at step 1030, control circuitry 804 trains the model with the reduced data set and user classifications.

In some embodiments, after determining at step 1026 that there are additional records to process, control circuitry 804 may, after step 1012, access the table, database, or data structure in which the arrangements and classifications of symbols are stored to determine if the current arrangement is present in any entry therein. If the arrangement is detected, control circuitry 804 may retrieve the classifications and automatically classify the symbols of the current record in accordance with the classifications stored in the entry. Control circuitry 804 may then present the automatic classifications to the user (e.g., via classification fields 120a and 120b) for verification.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 10.

Figure 11:
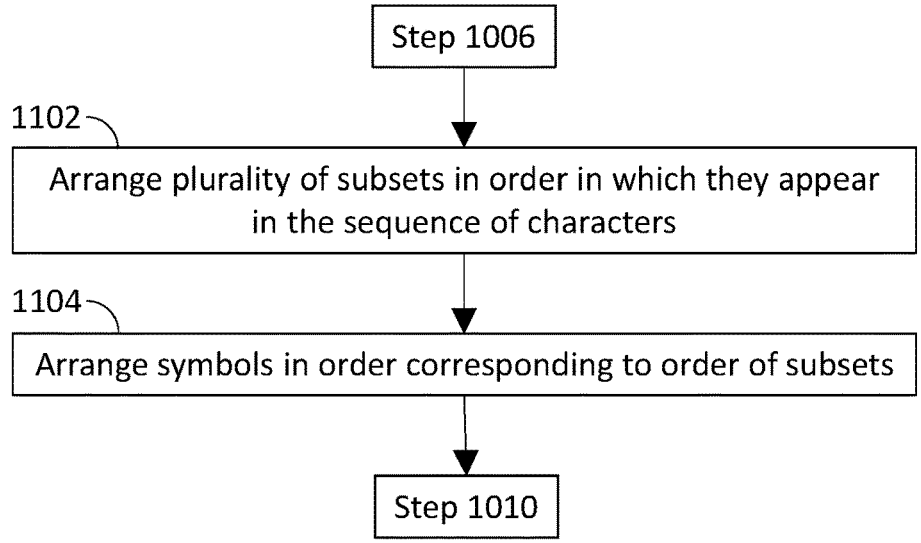
FIG. 11 is a flowchart representing a process for determining an arrangement of symbols according to an embodiment of the disclosure.

The flowchart in FIG. 11 represents a process 1100 implemented on control circuitry 804 for determining an arrangement symbols in each subset in accordance with an embodiment of the disclosure. It should be noted that process 1100 or any step thereof could be performed on, or provided by, any of the devices shown in FIGS. 8-9. For example, process 1100 may be executed by control circuitry 804 (FIG. 8) as instructed by a media guidance application implemented on a user device (e.g., user equipment devices 902, 904, and/or 906 (FIG. 9)) in order to determine an arrangement of symbols in each subset. In addition, one or more steps of process 1100 may be incorporated into or combined with one or more steps of any other process or embodiment described herein.

At step 1102, control circuitry 804 arranges the plurality of subset in the order in which they appear in the sequence of characters. In determining the subsets of the sequence of characters, control circuitry 804 may create a list, array, database, flat file, or any other suitable data structure in which to record the various subsets. The data structure may be stored in, for example, storage 808. Control circuitry 804 may include in the data structure a field or variable for each subset to which control circuitry may assign as a value the symbol for each respective subset. For example, in determining subsets of the sequence of characters comprising the data record "The Simpsons, 7-7:30 pm, "Kamp Krusty", Repeat, (1992).", the data structure may include five fields, one for each of the five subsets contained within the sequence of characters, and having the values "/a, /b, /a, /r, /n" corresponding to the symbol of each respective subset, where "/r" may be used to indicate a repeat status flag (e.g., "Repeat" or "New"). Control circuitry 804 may determine subsets in any order, not just in the order in which they appear in the character string. For example, control circuitry may determine subsets by symbol grouping. In other words, control circuitry may, for example, first determine subsets with only numeric characters, followed by subsets with only alphabetic characters, and further followed by subsets with alphanumeric characters. Thus, the data structure may also include a positional identifier or index to indicate the original arrangement of the subsets. For example, the data structure representing the record "The Simpsons, 7-7:30 pm, "Kamp Krusty", Repeat, (1992)." may contain data such as "[/a|0], [/a|2], [/n|4], [/b|1], [/r|3]" indicating alphabetic subsets at positions 0, and 2, a numeric subset at position 4, an alphanumeric subset at position 1, and a repeat flag subset at position 3. At step 1104, control circuitry 804 arranges the symbols in order corresponding to the order of the subsets. Control circuitry 804 may extract from the data structure the listing of subsets contained therein and sort them in order according to the positional identifier or index. Continuing the example above, control circuitry 804 may sort the data into the order "[/a|0], [/b|1], [/a|2], [/r|3], [/n|4]" representing the order in which the subsets appear in the sequence of characters. Control circuitry 804 may then extract from each item the symbol corresponding to each respective subset, thereby obtaining an arrangement of the symbols (e.g., "/a, /b, /a, /r, /n") in an order corresponding to the order of the subsets within the sequence of characters.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 11.

Figure 12:
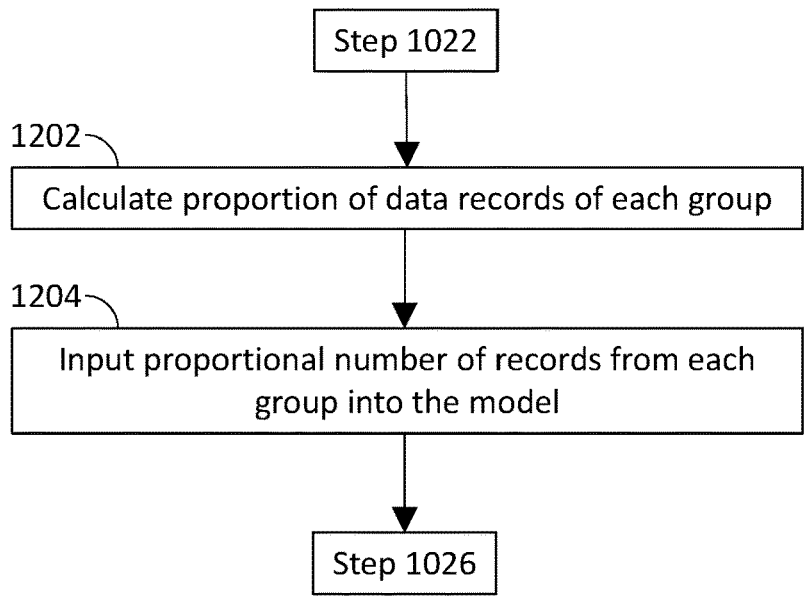
FIG. 12 is a flowchart representing a process for proportionally feeding data records into a model according to an embodiment of the disclosure.

The flowchart in FIG. 12 represents a process 1200 implemented on control circuitry 804 for feeding a reduced data set into the model in accordance with an embodiment of the disclosure. It should be noted that process 1200 or any step thereof could be performed on, or provided by, any of the devices shown in FIGS. 8-9. For example, process 1200 may be executed by control circuitry 804 (FIG. 8) as instructed by a media guidance application implemented on a user device (e.g., user equipment devices 902, 904, and/or 906 (FIG. 9)) in order to feed a reduced data set into the model. In addition, one or more steps of process 1200 may be incorporated into or combined with one or more steps of any other process or embodiment described herein.

After processing and classifying a set of records, control circuitry 804 may feed a representative sample of records into the machine learning model as a reduced data set for training. It may be preferable for the reduced data set to mimic the full set of records in composition, but at a reduced scale. To accomplish this, at step 1202, control circuitry 804 calculates the proportion of data records in each group. For example, after processing a set of 5000 records, 2000 records may be in a first group, and 3000 may be in a second group. Control circuitry 804 will then calculate that there are fifty percent more records in the second group than in the first group, or a proportion of 2:3. At step 1204, control circuitry inputs a proportional number of records from each group into the model. Thus, the reduced data set used for training the model comprises the same proportion of records in each group as the full data set. For example, if the proportion is calculated as 2:3, control circuitry 804 may then input two records from the first group and three records from the second group into the model. As another example, after processing a set 5000 records, 1500 records may be in a first group, 2000 records may be in a second group, 500 records may be in a third group, 975 records may be in a fourth group, and 25 records may be in a fifth group. Control circuitry 804 may calculate a proportion of, for example, 15:20:5:9.75:0.25. Control circuitry 804 may multiply the proportional numbers to arrive at integer values at least for the smallest group. For example, control circuitry 804 may multiply the proportional values by four to obtain a proportion of 60:80:20:39:1. Control circuitry 804 may then input 60 records from the first group, 80 records from the second group, 20 records from the third group, 39 records from the fourth group, and a single record from the fifth group as the reduced data set. As an alternative to multiplying the proportional values, control circuitry 804 may assign a weighting factor to the representative records of each group, the weighting factor representing the proportional value.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 12.

Figure 13:
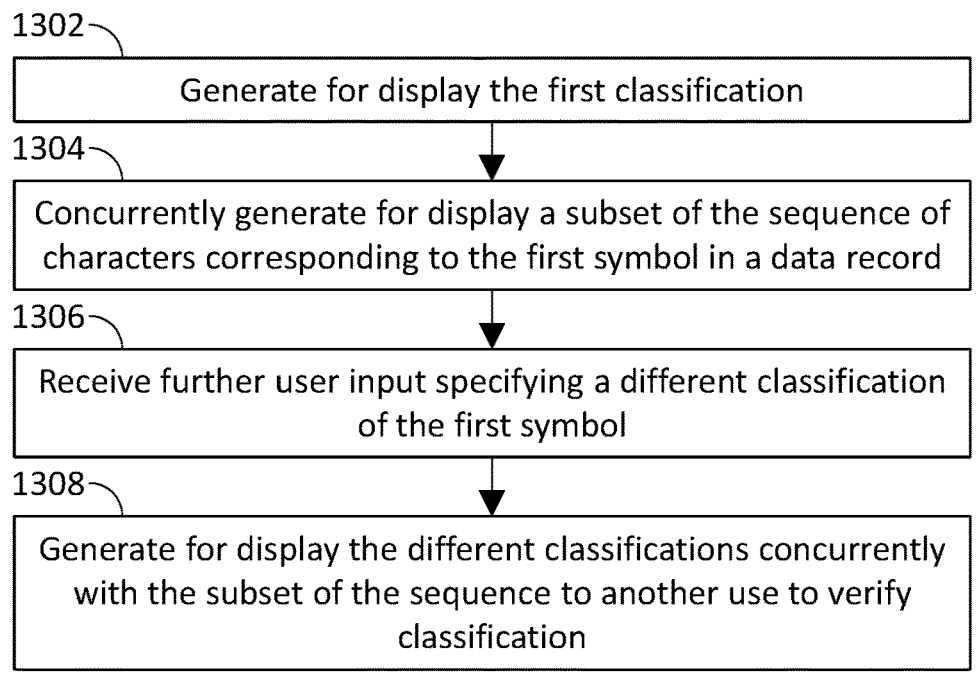
FIG. 13 is a flowchart representing a process for verifying classifications of symbols according to an embodiment of the disclosure.

The flowchart in FIG. 13 represents a process 1300 implemented on control circuitry 804 for displaying user classifications of symbols for verification by another user in accordance with an embodiment of the disclosure. It should be noted that process 1300 or any step thereof could be performed on, or provided by, any of the devices shown in FIGS. 8-9. For example, process 1300 may be executed by control circuitry 804 (FIG. 8) as instructed by a media guidance application implemented on a user device (e.g., user equipment devices 902, 904, and/or 906 (FIG. 9)) in order to display user classification of symbols for verification by another user. In addition, one or more steps of process 1300 may be incorporated into or combined with one or more steps of any other process or embodiment described herein.

A second user may be required to verify classifications entered by a first user. At step 1302, control circuitry 804 generates for display the first classifications 402a, 402b entered by the first user, an example of which is shown in FIG. 4. At step 1304, control circuitry 804 concurrently generates for display a subset of the sequences of characters 116a, 116b corresponding to a symbol in the data record. If the second user believes the classification entered by the first user is wrong, then, at step 1306, control circuitry 804 receives further input (e.g., through interactive elements 404a, 404b, 120a, and 120b) specifying a different classification for the symbol. At step 1308, control circuitry 804 may display to a third user the two classifications entered by the first user and the second user. The third user, such as a supervisor or quality control person, may verify which of the two classifications is correct.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 13.

Data records may sometimes be retrieved from sources that are not formatted to be parsed by a computer, such as printed schedules, or webpages. Such sources display listings in a format that is easy for humans to read and understand, often using different colors, font sizes, or font styles to differentiate or emphasize certain parts of each listing. FIG. 5 is an example of one such listing source. As can readily be discerned by an ordinary person familiar with television schedules, elements 502, 504, 506, 508, and 510 are all parts of a single listing. Element 502 represents the time at which the program is broadcast. Element 504 represents the genre of the program. Element 506 represents the program title, while element 508 represents the episode title. Element 510 represents a synopsis of the episode, while element 512 represents that episode is new. An ordinary person familiar with television schedules would easily understand that, even though element 512 appears as part of the paragraph comprising synopsis 510, it is a separate element. Element 514 represents the rating of the program, and element 516 represents format information such as high-definition ("HD") and the availability of closed captions ("CC").

Figure 14:
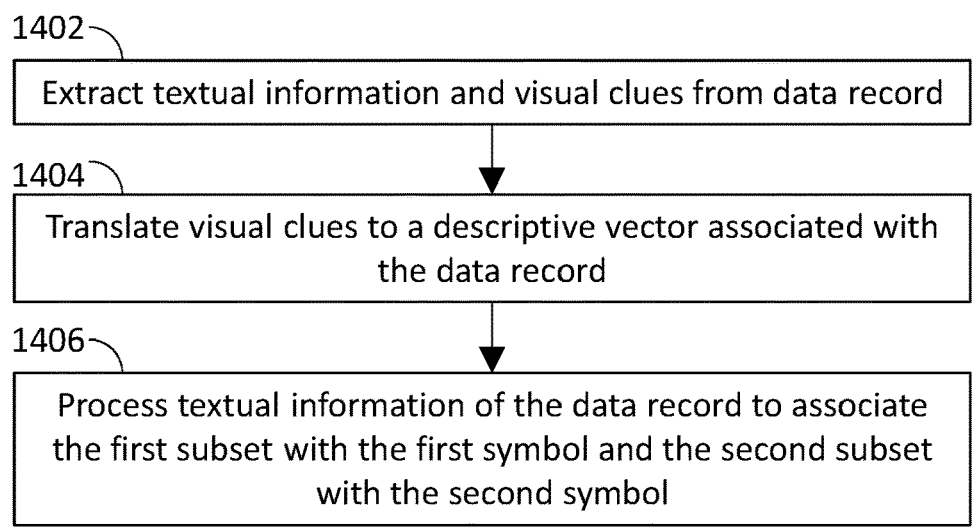
FIG. 14 is a flowchart representing a process for associating symbols with subsets of a sequence of characters based on visual clues using a descriptive vector according to an embodiment of the disclosure.

The flowchart in FIG. 14 represents a process 1400 implemented on control circuitry 804 for processing textual and visual clues from data records in accordance with an embodiment of the disclosure. It should be noted that process 1400 or any step thereof could be performed on, or provided by, any of the devices shown in FIGS. 8-9. For example, process 1400 may be executed by control circuitry 804 (FIG. 8) as instructed by a media guidance application implemented on a user device (e.g., user equipment devices 902, 904, and/or 906 (FIG. 9)) in order to process textual and visual clues from data records. In addition, one or more steps of process 1400 may be incorporated into or combined with one or more steps of any other process or embodiment described herein.

At step 1402, control circuitry 804 extracts textual and visual clues from the data record. Referring to the exemplary embodiment of FIG. 5, control circuitry 804 may extract the text of elements 502 and 504 together because they appear on the same line. Control circuitry 804 may then evaluate visual clues such as the change in font style from bold to italics, and the change in font size to determine that elements 502 and 504 are independent of each other. Similarly, control circuitry 804 may extract the text of elements 506 and 514 together because they also appear on the same line. Evaluating visual clues such as font size and font style, control circuitry 804 may determine that elements 506 and 514 are independent elements. Moving to the next line of text, elements 508 and 516 may be determined to be independent elements due to the change in font size. Finally, element 512 may be determined as independent from the text of element 510 due to the parentheses surrounding it.

At step 1404, control circuitry 804 may translate the visual clues into a descriptive vector. To accomplish this, control circuitry 804 steps through each word, symbol, and logical grouping of words and analyzes the styles of each, as well as word capitalization. The following table is an example of a descriptive vector based on the exemplary embodiment of FIG. 5.

| Case | Symbol | Pos | Value | inBraces | Alpha? | Numeric? | Bold? | Italics? | Element |
|---|---|---|---|---|---|---|---|---|---|
| FALSE | /t | 0 | 7:00 | FALSE | FALSE | TRUE | TRUE | FALSE | 1 |
| FALSE | /s | 1 | — | FALSE | FALSE | FALSE | TRUE | FALSE | 1 |
| FALSE | /t | 2 | 7:30 | FALSE | FALSE | TRUE | TRUE | FALSE | 1 |
| Upper | /m | 3 | PM | FALSE | TRUE | FALSE | TRUE | FALSE | 1 |
| Title | /a | 4 | Comedy | FALSE | TRUE | FALSE | FALSE | TRUE | 2 |
| Title | /a | 5 | The Si . . . | FALSE | TRUE | FALSE | TRUE | FALSE | 3 |
| Upper | /r | 6 | TV-14 | FALSE | TRUE | FALSE | FALSE | FALSE | 4 |
| Title | /a | 7 | Kamp . . . | FALSE | TRUE | FALSE | FALSE | FALSE | 5 |
| Upper | /c | 8 | CC | FALSE | TRUE | FALSE | FALSE | FALSE | 6 |
| Upper | /f | 9 | HD | FALSE | TRUE | FALSE | FALSE | FALSE | 7 |
| Title | /a | 10 | During | FALSE | TRUE | FALSE | FALSE | FALSE | 8 |
| Lower | /a | 11 | summe . . . | FALSE | TRUE | FALSE | FALSE | FALSE | 8 |
| FALSE | /s | 12 | , | FALSE | FALSE | FALSE | FALSE | FALSE | 8 |
| Title | /a | 13 | Bart | FALSE | TRUE | FALSE | FALSE | FALSE | 8 |
| Lower | /a | 14 | and | FALSE | TRUE | FALSE | FALSE | FALSE | 8 |
| Title | /a | 15 | Lisa | FALSE | TRUE | FALSE | FALSE | FALSE | 8 |
| Lower | /a | 16 | attend . . . | FALSE | TRUE | FALSE | FALSE | FALSE | 8 |
| Title | /a | 17 | Kamp . . . | FALSE | TRUE | FALSE | FALSE | FALSE | 8 |
| FALSE | /s | 18 | , | FALSE | FALSE | FALSE | FALSE | FALSE | 8 |

-continued

| Case | Symbol | Pos | Value | inBraces | Alpha? | Numeric? | Bold? | Italics? | Element |
|---|---|---|---|---|---|---|---|---|---|
| Lower | /a | 19 | a sum . . . | FALSE | TRUE | FALSE | FALSE | FALSE | 8 |
| Title | /s | 20 | Krusty | FALSE | FALSE | FALSE | FALSE | FALSE | 8 |
| Lower | /a | 21 | The | FALSE | TRUE | FALSE | FALSE | FALSE | 8 |
| Title | /a | 22 | Clown | FALSE | TRUE | FALSE | FALSE | FALSE | 8 |
| FALSE | /s | 23 | . | FALSE | FALSE | FALSE | FALSE | FALSE | 8 |
| Title | /a | 24 | The | FALSE | TRUE | FALSE | FALSE | FALSE | 8 |
| Lower | /a | 25 | camp i . . . | FALSE | TRUE | FALSE | FALSE | FALSE | 8 |
| FALSE | /a | 26 | , | FALSE | FALSE | FALSE | FALSE | FALSE | 8 |
| Lower | /a | 27 | leadin . . . | FALSE | TRUE | FALSE | FALSE | FALSE | 8 |
| FALSE | /s | 28 | . | FALSE | FALSE | FALSE | FALSE | FALSE | 8 |
| FALSE | /s | 29 | ( | FALSE | FALSE | FALSE | FALSE | FALSE | 9 |
| Title | /a | 30 | Repeat | TRUE | TRUE | FALSE | FALSE | FALSE | 9 |
| FALSE | /s | 31 | ) | FALSE | FALSE | FALSE | FALSE | FALSE | 9 |

In the example of FIG. 5, control circuitry 804 may generate a descriptive vector similar to the table above. Beginning with the first text element in the listing, control circuitry 804 may be configured to identify the pattern "[#]#:##" as a time of day. Since all characters in the text element are either numbers or symbols (in this case, a colon), control circuitry 804 may enter "FALSE" in the "Case" column for this element, as it only applies to characters subject to capitalization (i.e., alphabetic characters). Control circuitry 804 may enter "/t" in the "Symbol" column, indicating that the element is a time. The "Pos" column is used as an index for each entry and control circuitry 804 may enter a "0" for the first element. In the table given above, the numbers in the "Pos" column increase by one or each entry. However, in some embodiments, control circuitry 804 may record positional indices as a number of character from the beginning of the listing. Control circuitry 804 may enter the text of the element, in this case "8:00" in the "Value" column. The "inBraces" column is used to identify elements that appear within parentheses or brackets. Since the current text element does not appear within parentheses or brackets, control circuitry 804 may enter "FALSE" in the "inBraces" column. The "Alpha?" and "Numeric?" columns indicate what types of characters appear in the element. In this case, only numbers appear aside from the colon symbol. Thus, control circuitry 804 may enter "FALSE" in the "Alpha?" column and "TRUE" in the "Numeric?" column. The "Bold?" and "Italics?" columns indicate font styles for each element. In this case, since the time appears in bold, control circuitry 804 may enter "TRUE" in the "Bold?" column and "FALSE" in the "Italics?" column. Finally, the "Element" column is used to group individual text elements according to their logical groupings based on the visual clues extracted from the listing. In this case, as "8:00" is the first element considered, control circuitry 804 may enter "1" in the "Element" column for this element. Element 1 in this example corresponds to element 502 of FIG. 5.

After processing the first text element, "7:00", control circuitry 804 may move to the next text element, "-". Control circuitry 804 may treat this dash symbol as its own element. Control circuitry 804 may enter "FALSE" in the "Case" column, and the symbol "/s" in the "Symbol" column, indicating that the characters contained in the element are symbols only, and are neither alphabetic nor numeric. Control circuitry may enter a "1" in the "Pos" column, indicating that this symbol appears in the second position of a zero-based position list. As mentioned above, control circuitry 804 may alternatively enter "5" as the number of characters (including spaces) from the beginning of the listing. Control circuitry 804 may enter "FALSE" in the "inBraces", "Alpha?", "Numeric?", and "Italics?" columns, and enter "TRUE" in the "Bold?" column. Finally, control circuitry 804 may be configured to identify that a dash may be part of a larger element. Control circuitry 804 may further be configured to identify that the preceding element is a time and conclude that the listing includes not only a start time for the listed program, but also an end time, separated by a dash. Based on this conclusion, control circuitry 804 may enter "1" in the "Element" column.

The next text element, "7:30", may be processed in a similar manner as "8:00" above. Again, control circuitry 804 may be configured to identify that this time may be part of a larger time range element of the listing and enter "1" in the "Element" column.

The following text element, "PM", may again be processed similarly to the preceding elements. In this case, control circuitry 804 may be configured to identify the pattern of two capital letters, with the second letter being "M" and the first letter being either "A" or "P". In response to the letters both being capitalized, control circuitry 804 may enter "Upper" in the "Case" column to indicate that all letters in the string are upper case letters. Control circuitry 804 may also enter the symbol "/m" in the "Symbol" column to indicate that the text element is an indicator of ante- or post-meridian time. Control circuitry 804 may also enter a "1" in the "Element" column for this text element.

The following text element in this example, "Comedy" (504), may be identified by control circuitry 804 as a new element, separate from the time element comprising the preceding four text elements, both for its reduced font size, and the change in font style from bold to normal weight. Thus, control circuitry 804 may enter "2" in the "Element" column for this text element. Since only the first letter of the text element is capitalized, control circuitry 804 may enter "Title" in the "Case" column. Further, since only alphabetic characters appear in the text element, control circuitry 804 may enter "/a" in the "Symbol" column, and "TRUE" in the "Alpha?" column.

The next text element in the example of FIG. 5 appears on a new line, and is again bold. Thus, control circuitry 804 may enter "3" in the "Element" column. The text of the element, "The Simpsons" (506), comprises two words, both capitalized and bolded. Control circuitry 804 may thus enter "Title" in the "Case" column, "/a" in the "Symbol" column, "TRUE" in the "Alpha?" column, and "TRUE" in the "Bold?" column.

The next text element, "TV-14" (514), may be identified by control circuitry 804 as a separate element, again due to the change in font size and style. Control circuitry 804 may be configured to identify certain sets of characters as ratings, such as MPAA ratings "G", "PG", "PG-13", "R", and "NC-17", as well as television ratings such as "TV-Y", "TV-Y7", "TV-PG", "TV-14", and "TV-MA". Control circuitry 804 may thus identify the text element "TV-PG" as a rating and may enter the symbol "/r" in the "Symbol" column to indicate this recognition.

The following text element, "Kamp Krusty" (508), may be identified by control circuitry 804 as a single element by its font size and style. Control circuitry 804 may enter "Title" in the "Case" column due to each word of the text element being capitalized. Control circuitry 804 may enter "/a" in the Symbol" column to indicate that only alphabetic characters appear in the text element, and "TRUE" in the "Bold?" column in response to the font style.

The following two text elements, "CC" and "HD" (516), may be identified as a single element, or as two separate elements. In the table above, control circuitry identifies them as two separate elements. Control circuitry 804 may be configured to identify certain capitalized combinations of characters as special abbreviations common to most program listings. For example, "CC" may refer to the availability of closed captions, "SAP" may refer to the availability of a secondary audio track in another language, and "HD" may refer to the availability of high-definition video. In the example of FIG. 5, the listed program has available closed captions and may be available in high-definition. Thus, the abbreviations "CC" and "HD" appear in the listing. Control circuitry 804 may be programmed to use special symbols to identify these abbreviations. In the table above, control circuitry 804 entered a special symbol "/c" for the closed captioning indicator, and a special symbol "/f" (used for format indicators) for the high-definition video indicator.

The next logical portion of the listing comprises the episode description 510. Control circuitry 804 may be configured to detect that all the text remaining to be processed in the listing is of the same font size and style. Due to the length of the text, control circuitry 804 may proceed to step through and assign symbols to each word or group of words. Control circuitry 804 may first process the word, whose first letter is capitalized. Control circuitry 804 may therefore enter "Title" in the "Case" column for this text element, and enter "Lower" if the "Case" column for the entry in the table corresponding to the next group of words, all of which appear in lower case. Control circuitry 804 may, however, separately enter any punctuation marks as individual text elements within the descriptive vector table. In the example above, control circuitry 804 indicates each punctuation mark as a separate text element with the symbol "/s" to indicate a non-alphanumeric character. Additionally, control circuitry 804 indicates each capitalized word as a separate text element with a "Title" case.

At the end of the episode description 510, there appears a repeat indicator 512. In the example of FIG. 5 and the table above, the repeat indicator appears in parentheses. Control circuitry 804 may indicate the opening and closing parentheses as any other punctuation mark or non-alphanumeric character by using the symbol "/s". However, after processing an opening parenthesis, the text that follows may be indicated by control circuitry 804 as being within parentheses by entering "TRUE" in the "inBraces" column.

In some embodiments, in addition to using the descriptive vector to identify subsets of a sequence of characters, control circuitry 804 may request or receive user input to classify subsets based on visual attributed noted in the descriptive vector. Control circuitry 804 may generate for display the data record, a first subset, and relevant portions of the descriptive vector representing the first subset (i.e., portion with the same number listed in the "Element" column). User input may then be requested or received (e.g., via user input interface 810) assigning a classification to a visual attribute or set of visual attributes of the record. For example, control circuitry 804 may generate for display the portions of the descriptive vector relating to the subset "7:00-7:30 PM". Control circuitry 804 may also generate for display classification options relating to visual attributes, as well as textual content. In this example, control circuitry 804 may generate for display classifications options relating to bold type, in addition to alphanumeric characters and uppercase letters.

Using the descriptive vector, control circuitry 804 may, at step 1406, process the textual information of the data record to associate each subset of the record with a symbol. For example, control circuitry 804 may combine or concatenate entries with the same element number, preserving their order of appearance, and assign a symbol to the entire element. Additionally, the descriptive vector may be generalized for use in processing other listings with the same arrangement of symbols.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 14.

In some embodiments, control circuitry 804 may use the descriptive vector, as well as user classifications of symbols to generate an interactive program guide such as that shown in FIG. 6. Control circuitry 804 may determine, based on program guide display parameters, which subsets are to be displayed. For example, in FIG. 6, the program title, air time, episode title, repeat status, release date, channel, and rating subsets are to be displayed in program information region 612, and titles are to be displayed in program listing cells of grid 602. Control circuitry 804 may then access the processed records and populate the display based on the assigned classifications.

In some embodiments, control circuitry 804 may automatically classify new data records using the descriptive vector, the user classifications, or a combination thereof. Control circuitry 804 may access the database of symbol arrangements and classifications and compare the new records to the database to locate an arrangement that matches the arrangement of the new records. Using the classifications contained in the database for the matching entry, control circuitry 804 may then automatically classify the new records. Control circuitry 804 may also present the automatic classifications to a user for verification.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for training a model using a reduced dataset, the method comprising:
   receiving a first data record comprising a first sequence of characters;
   detecting a first plurality of subsets of the first sequence of characters;
   associating a first subset of the first plurality of subsets with a first symbol, wherein the first subset of the first plurality of subsets corresponds to a first type of character;
   associating a second subset of the first plurality of subsets with a second symbol, wherein the second subset of the first plurality of subsets corresponds to a second type of character;
   determining a first arrangement of the first and second symbols based on an arrangement of the first and second subsets of the first plurality of subsets within the first sequence of characters;
   receiving, from a user input device, user input specifying a first classification for the first symbol and a second classification for the second symbol;
   adding the first data record to a first group of records;
   receiving a second data record comprising a second sequence of characters;
   detecting a second plurality of subsets of the second sequence of characters;
   associating a first subset of the second plurality of subsets with a third symbol, wherein the first subset of the second plurality of subsets corresponds to a third type of character;
   associating a second subset of the second plurality of subsets with a fourth symbol, wherein the second subset of the second plurality of subsets corresponds to a fourth type of character;
   determining a second arrangement of the third and fourth symbols based on an arrangement of the first and second subsets of the second plurality of subsets within the second sequence of characters;
   receiving, from the user input device, user input specifying a third classification for the third symbol and a fourth classification for the fourth symbol;
   determining whether the first arrangement and second arrangement are identical;
   in response to determining that the first arrangement and the second arrangement are identical, adding the second data record to the first group of records;
   in response to determining that the first arrangement and the second arrangement are not identical, adding the second data record to a second group of records;
   feeding the first and second data records to the model as the reduced dataset; and
   training the model with both the reduced dataset and the user specified first, second, third and fourth classifications.

2. The method of claim 1, wherein feeding the first and second data records further comprises inputting data records from the first group of records and the second group of records in proportion to a first number of data records in the first group of records relative to a second number of data records in the second group of records.

3. The method of claim 1, wherein the first arrangement of the first and second symbols is a summarized representation of the first data record, and the second arrangement of the third and fourth symbols is a summarized representation of the second data record.

4. The method of claim 1, further comprising:
   receiving the first data record and the second data record from a data source; and
   wherein training the model with both the reduced dataset and the user specified first, second, third and fourth classifications further comprises training the model solely using data records from the data source.

5. The method of claim 1, further comprising:
   generating for display the first classification for the first symbol concurrently with the first subset of the first plurality of subsets in the first data record to a second user to verify classification; and
   receiving a further user input from the second user specifying a fifth classification for the first symbol, the fifth classification differing from the first classification.

6. The method of claim 1, further comprising:
   extracting first textual information and first visual clues from the first data record;
   translating the first visual clues to a first descriptive vector associated with the first data record;
   processing the first textual information of the first data record to associate the first subset of the first plurality of subsets with the first symbol and the second subset of the first plurality of subsets with the second symbol;
   extracting second textual information and second visual clues from the second data record;
   translating the second visual clues to a second descriptive vector associated with the second data record;
   processing the second textual information of the second data record to associate the first subset of the second plurality of subsets with the third symbol and the second subset of the second plurality of subsets with the fourth symbol; and
   wherein training the model further comprises training the model with both the reduced dataset and the first and second descriptive vectors.

7. The method of claim 6, wherein the first and second visual clues comprise text color, bold font, italics, indentations, spacing, graphics, icons, and glyphs.

8. The method of claim 6, wherein only one descriptive vector is translated from the visual clues for each of the first and second groups.

9. The method of claim 1, wherein the first, second, third, and fourth types of characters are alphanumeric symbols, numbers, punctuations, scientific operators, non-Latin scripts, and Unicode symbols.

10. The method of claim 1, wherein:
   the first sequence of characters comprises alphanumeric characters;
   the first subset of the first plurality of subsets comprises alphabetic characters only;
   the first symbol comprises a symbol representing an alphabetic character string;
   the first type of character comprises alphabetic characters;
   the second subset of the first plurality of subsets comprises numeric characters only;
   the second symbol comprises a symbol representing a numeric character string;

the second type of character comprises numeric characters;

the first arrangement of the first and second symbols is a summarized representation of the first data record;

the first classification is a media asset title;

the second classification is a media asset release year; and the second arrangement is a summarized representation of the second data record, and is different from the first arrangement.

11. A system for training a model using a reduced dataset comprising computer-readable memory, a user input device, and control circuitry configured to:

receive a first data record comprising a first sequence of characters;

detect a first plurality of subsets of the first sequence of characters;

associate a first subset of the first plurality of subsets with a first symbol, wherein the first subset of the first plurality of subsets corresponds to a first type of character;

associate a second subset of the first plurality of subsets with a second symbol, wherein the second subset of the first plurality of subsets corresponds to a second type of character;

determine a first arrangement of the first and second symbols based on an arrangement of the first and second subsets of the first plurality of subsets within the first sequence of characters;

receive, from the user input device, user input specifying a first classification for the first symbol and a second classification for the second symbol;

add the first data record to a first group of records;

receive a second data record comprising a second sequence of characters;

detect a second plurality of subsets of the second sequence of characters;

associate a first subset of the second plurality of subsets with a third symbol, wherein the first subset of the second plurality of subsets corresponds to a third type of character;

associate a second subset of the second plurality of subsets with a fourth symbol, wherein the second subset of the second plurality of subsets corresponds to a fourth type of character;

determine a second arrangement of the third and fourth symbols based on an arrangement of the first and second subsets of the second plurality of subsets within the second sequence of characters;

receive, from the user input device, user input specifying a third classification for the third symbol and a fourth classification for the fourth symbol;

determine whether the first arrangement and the second arrangement are identical;

in response to determining that the first arrangement and the second arrangement are identical, add the second data record to the first group of records;

in response to determining that the first arrangement and the second arrangement are not identical, add the second data record to a second group of records;

feed the first and second data records to the model as the reduced dataset; and train the model with both the reduced dataset and the user specified first, second, third, and fourth classifications.

12. The system of claim 11, wherein control circuitry configured to feed the first, second, and third data records is further configured to input data records from the first group and the second group in proportion to a first number of data records in the first group relative to a second number of data records in the second group.

13. The system of claim 11, wherein the first arrangement of the first and second symbols is a summarized representation of the first data record, and the second arrangement of the third and fourth symbols is a summarized representation of the second data record.

14. The system of claim 11, wherein the control circuitry is further configured to receive the first data record and the third data record from a data source; and train the model with both the reduced dataset and the user specified first, second, third, and fourth classifications solely using data records from the data source.

15. The system of claim 11, wherein the control circuitry is further configured to:

generate for display the first classification for the first symbol concurrently with the first subset of the first plurality of subsets in the first data record to a second user to verify classification; and receive a further user input from the second user specifying a fifth classification for the first symbol, the fifth classification differing from the first classification.

16. The system of claim 11, wherein the control circuitry is further configured to:

extract first textual information and first visual clues from the first data record;

translate the first visual clues to a first descriptive vector associated with the first data record;

process the first textual information of the first data record to associate the first subset of the first plurality of subsets with the first symbol and the second subset of the first plurality of subsets with the second symbol;

extract second textual information and second visual clues from the second data record;

translate the second visual clues to a second descriptive vector associated with the second data record;

process the second textual information of the second data record to associate the first subset of the second plurality of subsets with the third symbol and the second subset of the second plurality of subsets with the fourth symbol; and wherein training the model further comprises training the model with both the reduced dataset and the first and second descriptive vectors.

17. The system of claim 16, wherein the first and second visual clues comprise text color, bold font, italics, indentations, spacing, graphics, icons, and glyphs.

18. The system of claim 16, wherein only one descriptive vector is translated from the visual clues for each of the first and second groups.

19. The system of claim 11, wherein the first, second, third, and fourth types of characters are alphanumeric symbols, numbers, punctuations, scientific operators, non-Latin scripts, and Unicode symbols.

20. The system of claim 11, wherein:

the first sequence of characters comprises alphanumeric characters;

the first subset of the first plurality of subset comprises alphabetic characters only;

the first symbol comprises a symbol representing an alphabetic character string;

the first type of character comprises alphabetic characters;

the second subset of the first plurality of subsets comprises numeric characters only;

the second symbol comprises a symbol representing a numeric character string;

the second type of character comprises numeric characters;

the first arrangement of the first and second symbols is a summarized representation of the first data record;

the first classification is a media asset title;

the second classification is a media asset release year; and the second arrangement is a summarized representation of the second data record, and is different from the first arrangement.

\* \* \* \* \*